US008619680B2

(12) United States Patent
Morita et al.

(10) Patent No.: US 8,619,680 B2
(45) Date of Patent: Dec. 31, 2013

(54) RADIO COMMUNICATION SYSTEM, BASE STATION APPARATUS, RADIO RESOURCE CONTROL METHOD, AND NON-TRANSITORY COMPUTER READABLE MEDIUM

(75) Inventors: Motoki Morita, Tokyo (JP); Yasuhiko Matsunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 140 days.

(21) Appl. No.: 13/366,032

(22) Filed: Feb. 3, 2012

(65) Prior Publication Data

US 2012/0201159 A1 Aug. 9, 2012

(30) Foreign Application Priority Data

Feb. 4, 2011 (JP) ................................. 2011-022960

(51) Int. Cl.
*H04Q 7/00* (2006.01)
*H04J 3/16* (2006.01)
(52) U.S. Cl.
USPC .......................................... 370/328; 370/468
(58) Field of Classification Search
USPC ................. 370/280, 281, 294, 295, 319–321, 370/328–330, 337, 338, 341, 442, 443, 468
See application file for complete search history.

(56) References Cited

U.S. PATENT DOCUMENTS

| | | | | |
|---|---|---|---|---|
| 7,613,143 B2 * | 11/2009 | Kakishima et al. | ............ | 370/328 |
| 8,223,712 B2 * | 7/2012 | Kim et al. | ...................... | 370/329 |
| 2009/0067376 A1 * | 3/2009 | Ishii et al. | ...................... | 370/329 |
| 2010/0118827 A1 | 5/2010 | Sundaresan et al. | | |
| 2010/0157922 A1 * | 6/2010 | Kim et al. | ...................... | 370/329 |
| 2010/0296460 A1 * | 11/2010 | Akimoto et al. | ............. | 370/329 |

FOREIGN PATENT DOCUMENTS

| | | |
|---|---|---|
| JP | 2010-206794 A | 9/2010 |
| WO | WO 2008/105091 A1 | 9/2008 |
| WO | WO 2009/047972 A1 | 4/2009 |
| WO | 2009/142954 A1 | 11/2009 |

OTHER PUBLICATIONS

3GPP contributions R1-103458, "Analysis on the eICIC schemes for the control channels in HetNet", TSG RAN WG1 #61bis meeting, Jul. 2010, pp. 1-7.
International Search Report for PCT/JP2012/051578 dated Mar. 6, 2012 [PCT/ISA/210 & 220].
Written Opinion for PCT/JP2012/051578 dated Mar. 6, 2012 [PCT/ISA/237].

* cited by examiner

*Primary Examiner* — Hong Cho
(74) *Attorney, Agent, or Firm* — Sughrue Mion, PLLC

(57) ABSTRACT

A base station includes a radio communication unit, a resource adjustment unit, a resource division unit and a detection unit. The resource adjustment unit determines radio resources to be allocated to a downlink communication from a radio resource region shared with another base station. The resource division unit limits, to a first radio resource segment which is a part of the radio resource region, radio resources in response to estimating that communication quality of the downlink communication using the limited first radio resource segment is improved over the communication quality of the first downlink communication when using the entire range of the radio resource region that is shared with the other base station. The detection unit detects execution of resource division by the other base station for limiting radio resources used for another downlink communication between the other base station and a mobile station to a second radio resource segment.

19 Claims, 18 Drawing Sheets

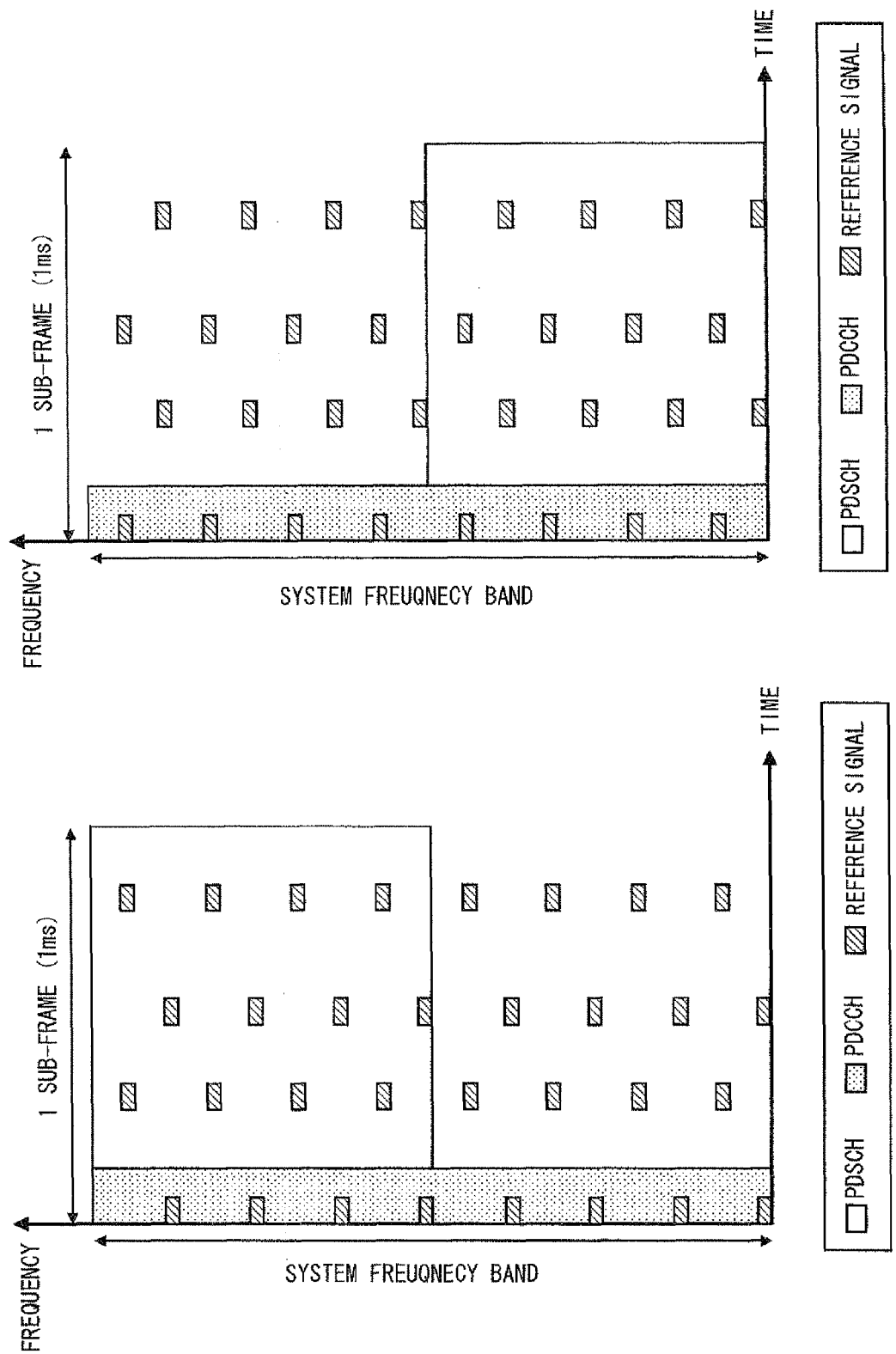

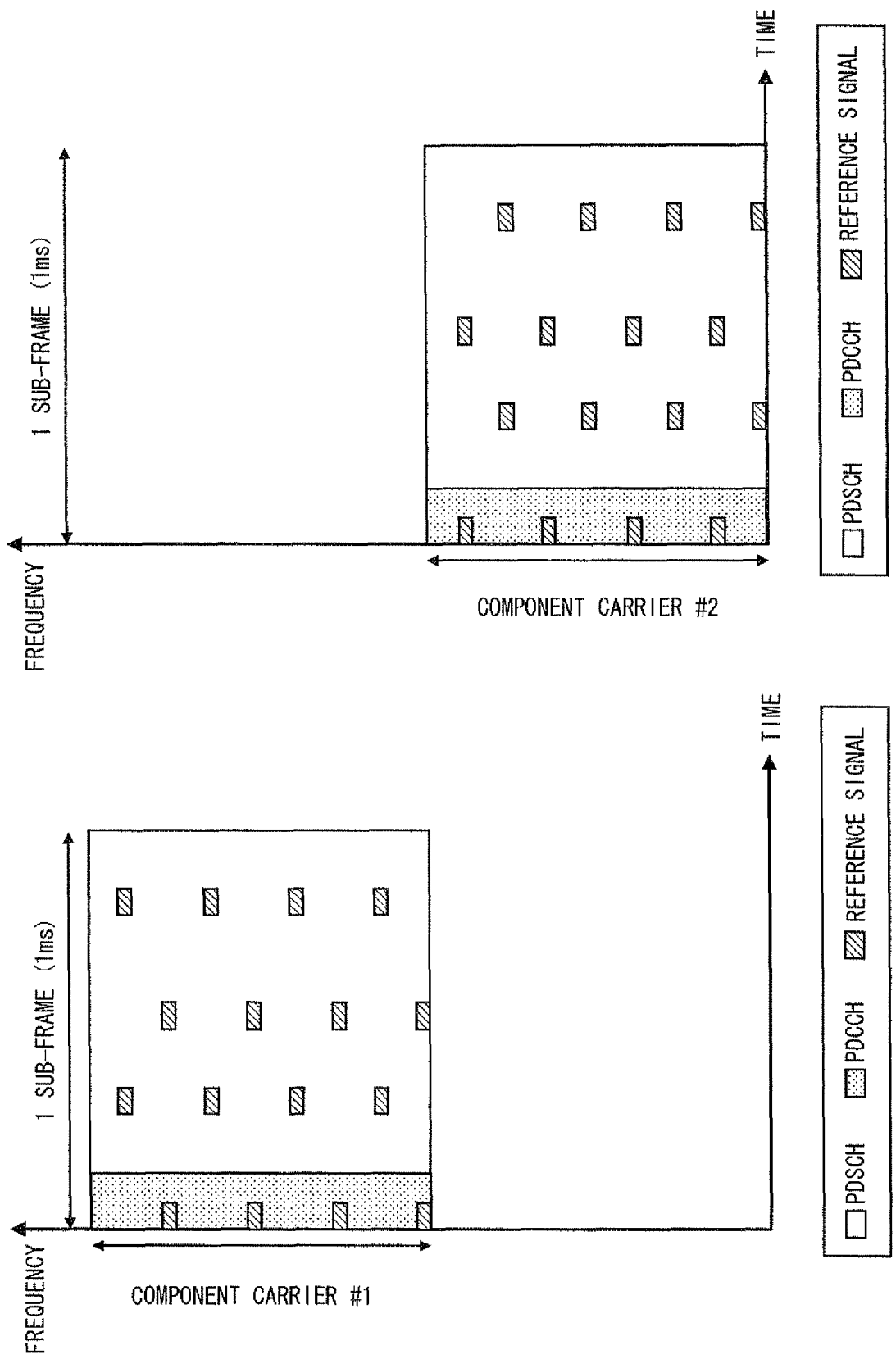

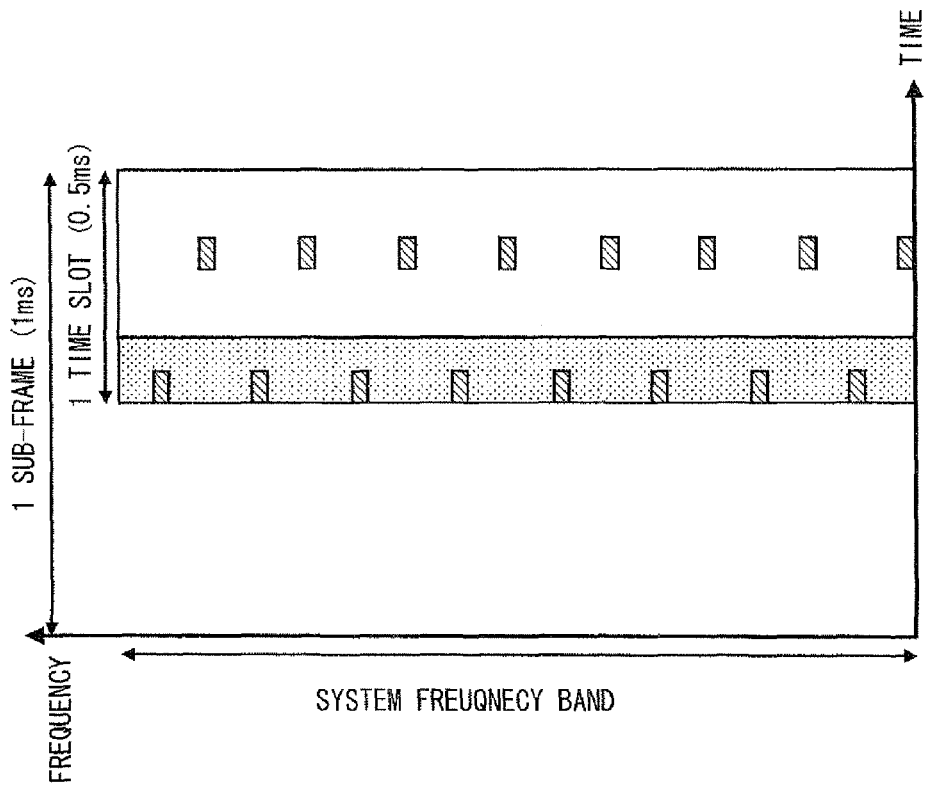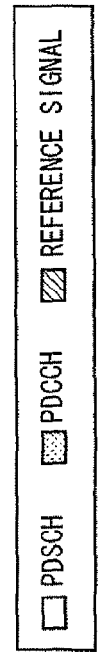
Fig. 19B
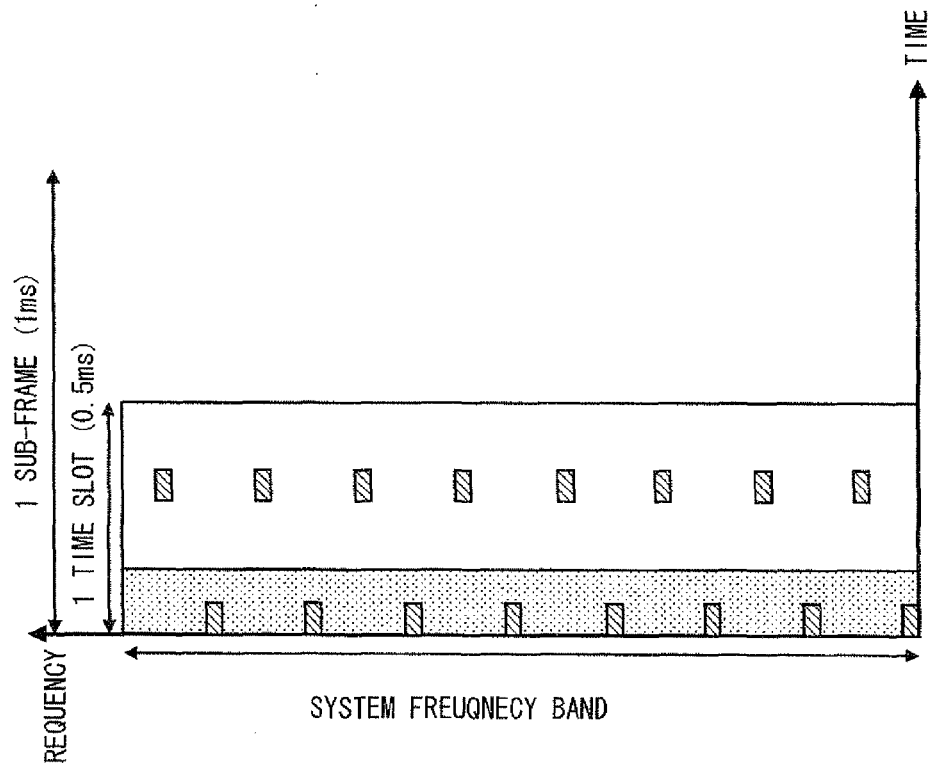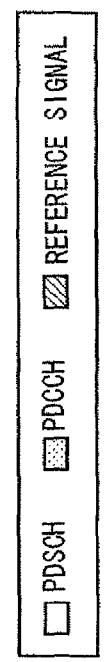
Fig. 19A

RADIO COMMUNICATION SYSTEM, BASE STATION APPARATUS, RADIO RESOURCE CONTROL METHOD, AND NON-TRANSITORY COMPUTER READABLE MEDIUM

INCORPORATION BY REFERENCE

This application is based upon and claims the benefit of priority from Japanese patent application No. 2011-022960, filed on Feb. 4, 2011, the disclosure of which is incorporated herein in its entirety by reference.

BACKGROUND

1. Technical Field

The present application relates to radio resource control including changing an amount of radio resource for use in radio communication between a base station and a mobile station.

2. Background Art

With the popularization of cellular phones, there is an increasing demand for voice communication and data communication. Seventy percent of the entire communication traffic is generated during communication indoors, for example, in users' houses, small-scale offices, and commercial facilities. To meet such an increasing demand, a small base station that can be installed indoors is currently under development. The coverage area of such a small base station is extremely smaller than that of a base station installed outdoors (hereinafter referred to as "macro base station"), so the coverage area of the small base station is called a femtocell, and the small base station is called a femtocell base station. The femtocell base station can accommodate high demand traffic as described above, and can be installed in locations where it is difficult for radio waves to penetrate, such as upper floors of buildings and underground malls. For this reason, the femtocell base station is now attracting attention as means for expanding the coverage area (communication area that satisfies a desired quality).

The use of the femtocell base station in radio communication standards for cellular phones, such as Wideband Code Division Multiple Access (W-CDMA) and Evolved Universal Terrestrial Radio Access (E-UTRA) of 3rd Generation Partnership Project (3GPP), and in radio communication standards for wireless metropolitan area network (wireless MAN), such as IEEE 802.16m, is now under review. In the W-CDMA standards, the femtocell base station is called Home NodeB (HNB). In the 3GPP E-UTRA standard, which is also called Long Term Evolution (LTE), the femtocell base station is called Home eNodeB (HeNB).

When the femtocell base station is used in a W-CDMA system, data transmission and reception using individual channels for performing transmission power control in an uplink and a downlink, and data transmission and reception using a shared channel in a downlink are carried out. Further, when the femtocell base station is used in an E-UTRA system, a radio frequency band is divided into a plurality of resource blocks (physical resource blocks (PRBs)). A scheduler included in a base station performs PRB allocation, and then data transmission and reception using the allocated PRBs is carried out. Furthermore, when the femtocell base station is used in an IEEE 802.16m system, OFDMA (Orthogonal Frequency Division Multiple Access) is adopted, and a radio frequency band is divided into subcarriers. Then, a scheduler included in a base station allocates the subcarriers, and data transmission and reception using the allocated subcarriers is carried out. A bundle of subcarriers corresponds to a resource block in E-UTRA.

The femtocell base station is connected to a backbone network (e.g. a core network of a carrier) through a femto gateway (femto GW). The femto GW is called Home NodeB Gateway in the W-CDMA standard and is also called Home eNodeB Gateway in the E-UTRA standard. When a mobile station is present in a femtocell, a mobile station registered in a femtocell base station can be connected to a network through the femtocell base station. On the other hand, a mobile station which is not registered in a femtocell base station cannot be connected to a network through the femtocell base station, or communication with the femtocell base station is limited compared to a registered mobile station. Hereinafter, a mobile station that is registered in advance in a femtocell base station is referred to as "registered mobile station", and a mobile station that is not registered in advance in a femtocell base station is referred to as "non-registered mobile station". Additionally, a mobile station that connects to and communicates with a femtocell base station is referred to as "femto mobile station", and a mobile station that connects to and communicates with a macro base station is referred to as "macro mobile station".

Base stations (for example, a macro base station, a micro base station, and a pico base station) in an existing mobile communication network transmit a reference signal (also referred to as "pilot signal") to an area that is covered by the base stations. Mobile stations receive the reference signal, establish synchronization, and estimate a channel, for example, thereby transmitting and receiving data to and from the base stations. Accordingly, it is requisite that the mobile stations can receive the reference signal with a satisfactory quality in order to provide a satisfactory communication quality. This also holds true for the femtocell base station.

When a femtocell base station is installed, inter-cell interference (ICI) between a femtocell and existing macro base stations and other adjacent femtocell base stations occurs. In particular, when these base stations use the same frequency band, ICI becomes significant. For example, there is a possibility that the femtocell base station causes downlink interference in the mobile station that communicates with another femtocell base station in an adjacent room, which results in an adverse effect on the communication of the mobile station. As methods for avoiding ICI, a transmission power control, a radio resource control on a frequency axis (i.e. frequency resource control), and a radio resource control on a time axis (i.e. time resource control) are generally devised.

For example, International Patent Publication No. WO 2009/047972 (hereinafter referred to as "PTL 1") discloses a transmission power control method as described below. First, a femtocell base station measures a reception quality of a reference signal received from a macro base station, and sets initial values of its own transmission power (transmission power of a reference signal and a maximum value of the transmission power) by adding a power offset to the measured value. Next, the femtocell base station receives, from a registered mobile station, a report including a measurement result as to a reception quality of a downlink signal (reference signal) received from the femtocell base station, and adjusts the transmission power of the femtocell base station so that the reception quality in the registered mobile station gets close to a target level. In other words, the femtocell base station disclosed in PTL 1 reduces its own transmission power when the reception quality of the downlink signal in the registered mobile station connected to the femtocell base station is higher than the target level, thereby reducing ICI to the adjacent femtocell base station.

3GPP contribution R1-103458, "Analysis on the eICIC schemes for the control channels in HetNet", TSG RAN WG1 #61bis meeting, July, 2010 (hereinafter referred to as "NPL 1") discloses examples of the frequency resource control and the time resource control. FIGS. 20A and 20B show an example of the frequency resource control. FIGS. 20A and 20B illustrate an example in which a PDSCH (Physical Downlink Shared Channel), a PDCCH (Physical Downlink Control Channel), and a reference signal are allocated within a 1 msec sub-frame of the E-UTRA when the same frequency band is used by two adjacent femtocell base stations. The PDSCH is a shared data channel for transmitting user data in a downlink. The PDCCH is a control channel for transmitting scheduling information for a downlink, such as a frequency arrangement, a modulation scheme, a data amount, and retransmission information. In the example shown in FIGS. 20A and 20B, a frequency band for downlink channels is divided into two frequency segments so as to prevent frequencies from overlapping each other between two adjacent femtocell base stations. Thus, these two femtocell base stations use different frequency segments within a single frequency band, thereby avoiding ICI.

International Patent Publication No. WO 2008/105091 (hereinafter referred to as "PTL 2") discloses a technique in which two base stations that manage two adjacent cells perform switching between a first frequency allocation pattern and a second frequency allocation pattern according to the time. In the first frequency allocation pattern, these two cells use the same frequency (e.g. f1 and f2). In the second frequency allocation pattern, these two cells use different frequencies (e.g. one of the cells uses f1, and the other cell uses f2). Specifically, a base station transmits downlink signals while switching the frequency allocation pattern, and mobile stations measure a reception quality (radio quality) of downlink signals received from the base station and report the measured reception quality to the base station. The base station collects measurement results of the radio quality from a plurality of mobile stations belonging to its own cell, determines, for each terminal, which one of the frequency allocation patterns satisfies a desired radio quality, and allocates each terminal to one of the first and second frequency patterns. In general, a mobile station positioned near the center of the cell performs communication during the time of the first frequency allocation pattern in which more frequencies can be used, and a mobile station positioned at the cell boundary performs communication during the time of the second frequency pattern in which interference with an adjacent cell is less likely to occur.

Japanese Unexamined Patent Application Publication No. 2010-206794 (hereinafter referred to as "PTL 3") discloses a technique in which a femtocell base station performs dynamic Inter-Cell Interference Coordination (ICIC).

Specifically, the femtocell base station acquires channel state information and interference information of downlink channels from a mobile station, and allocates, so as to optimize the performance of a network by using such information, time and frequency resources for transmitting data to the mobile station on the downlink channel. For example, when transmission powers of femtocell base stations are small, two adjacent femtocell base stations use a modulation scheme in which a distance between symbols is large and a desired SINR (Signal-to-Interference plus Noise power Ratio) is low (e.g. BPSK (Binary Phase Shift Keying)). To set a throughput to be constant, most radio resources on a time axis and a frequency axis are used, so that the radio resources used by the two adjacent femtocell base stations overlap each other. On the other hand, when transmission powers of femtocell base stations are large, two adjacent femtocell base stations use a modulation scheme in which the distance between symbols is small and the desired SINR is high (e.g. 16QAM (Quadrature Amplitude Modulation)). Since the required radio resources for the constant throughput can be reduced, thereby preventing the radio resources used by the two adjacent femtocell base stations from overlapping each other.

However, if the transmission power control or the frequency division, which are described above, are applied in a situation where femtocell base stations are installed at locations close to each other, unfairness in communication quality occurs between the femtocell base stations, and a decrease in frequency use efficiency occurs, for example. As an illustrative situation where femtocell base stations are installed at locations close to each other, there is a situation where the femtocell base stations are installed in adjacent houses (rooms) within an apartment house.

Problems will be described with reference to FIGS. 21A and 21B. Attention is focused on two adjacent users' houses 9A and 9B within an apartment house. Femtocell base stations 91A and 91B are installed in the user's houses 9A and 9B, respectively. The femtocell base stations 91A and 91B are communicating with registered mobile stations 92A and 92B, respectively. The mobile station 92B in the user's house 9B is a non-registered mobile station for the femtocell base station 91A in the user's house 9A. Similarly, the mobile station 92A in the user's house 9A is a non-registered mobile station for the femtocell base station 91B in the user's house 9B. Referring to FIG. 21A, the mobile stations 92A and 92B are positioned in the user's houses 9A and 9B, respectively. Referring to FIG. 21B, the mobile station 92A visits the user's house 9B.

When the base station 91A and 91B execute the transmission power control in accordance with the technique disclosed in PTL 1, the level of ICI occurring in the mobile stations 92A and 92B is low in the case of FIG. 21A, so that a satisfactory communication quality can be ensured. In the case of FIG. 21B, however, the mobile station 92A (non-registered mobile station for the femtocell base station 91B) which has visited the user's house 9B receives significant interference from the femtocell base station 91B. This may result in deterioration in the communication quality of the mobile station 92A, and may result in not being able to establish communication between the mobile station 92A and the femtocell base station 91A. Further, in the case of FIG. 21B, the communication quality of the femtocell base station 91B is maintained in the satisfactory state, but the communication quality of the femtocell base station 91A may deteriorate due to the influence of ICI. In short, when the technique disclosed in PTL 1 is employed, unfairness in communication quality occurs between the femtocell base stations 91A and 91B in the case of FIG. 21B.

On the other hand, when the base station 91A and 91B execute the frequency division in accordance with the technique disclosed in NPL 1, ICI received by the mobile station 92A, which has visited the user's house 9B, from the femtocell base station 91B can be alleviated in the case of FIG. 21B. This makes it possible to prevent the communication of the mobile station 91A from being disabled and to ensure the fairness in the communication quality between the femtocell base stations 91A and 91B. In the case of FIG. 21A, however, the frequency resources available for the mobile stations 92A and 92B are reduced due to the band division, with the result that the communication capacity (throughput) of each femtocell is reduced.

PTL 2 merely discloses that base stations constantly perform the operation for switching the frequency allocation pattern according to the time, and fails to disclose a technique for determining whether or not to perform the operation for switching the frequency allocation pattern, based on the communication quality. Accordingly, as with the technique disclosed in NPL1, in the technique disclosed in PTL 2, the use efficiency of the frequency resources decreases and the communication capacity (throughput) of each femtocell is reduced in the case of FIG. 21A. Further, when the operation for switching the frequency allocation pattern as disclosed in PTL 2 is carried out, the frequency allocation pattern using all available frequencies (e.g. the first frequency allocation pattern using f1 and f2) cannot be substantially used in the case of FIG. 21B, which results in a decrease in the use efficiency of the time resources and reduction in the communication capacity (throughput) of each femtocell.

When the dynamic ICIC disclosed in PTL 3 is constantly carried out, in the case of FIG. 21A, the femtocell base stations 91A and 91B reduce the transmission power and utilize overlapping radio resources, so that an improvement in the use efficiency of the frequency resources can be expected. In the case of FIG. 21B, the femtocell base stations 91A and 91B increase the transmission power and avoid the use of overlapping radio resources, so that suppression of ICI can be expected In the case of FIG. 21B, however, even if the transmission powers of the base station 91A and 91B are equally high, a propagation loss between the femtocell base station 91A and the mobile station 92A is considerably larger than a propagation loss between the femtocell base station 91B and the mobile station 92B. Accordingly, there is a possibility that the femtocell base station 91A and the mobile station 92A obtain a throughput relatively lower than that of the femtocell base station 91B and the mobile station 92B. In other words, when the dynamic ICIC disclosed in PTL 3 is employed, unfairness in the communication quality may occur between the femtocell base stations 91A and 91B in the case of FIG. 21B.

Though the situation in which a mobile station visits another user's house as shown in FIG. 21B is an assumed extreme case, a similar problem occurs in a situation where a mobile station receives strong ICI from a femtocell base station located in another user's house even when the mobile station does not visit another user's house.

SUMMARY

Certain embodiments of the present invention provide a radio communication system, a base station apparatus, a radio resource control method, and a program which are capable of avoiding a decrease in use efficiency of radio resources in the situation where the influence of ICI is small, and capable of avoiding unfairness in communication quality between adjacent cells in the situation where the influence of ICI is large.

According to one embodiment, the radio communication system includes first and second base stations, first and second resource adjustment units, a quality estimation unit, and first and second resource division units. The first base station performs radio communication including at least a first downlink communication with a first mobile station. The second base station performs radio communication including at least a second downlink communication with a second mobile station. The first resource adjustment unit determines radio resources to be allocated to the first downlink communication from a radio resource region shared between the first and second base stations. The second resource adjustment unit determines radio resources to be allocated to the second downlink communication from the radio resource region. The quality estimation unit estimates a communication quality of the first downlink communication when radio resources allocatable to the first downlink communication are limited to a part of the radio resource region. The first resource division unit limits, to a first radio resource segment which is a part of the radio resource region, radio resources in response to estimating that communication quality of the first downlink communication using the limited first radio resource segment is improved over the communication quality of the first downlink communication when using the entire range of the radio resource region that is shared with the second base station. The detection unit detects execution of resource division for limiting a radio resource used for the first downlink communication to the first radio resource segment. The second resource division unit limits, to a second radio resource segment which is a part of the radio resource region and different from the first radio resource segment, radio resources allocatable to the second downlink communication by the second resource adjustment unit in response to detection of the resource division.

According to another embodiment, the base station apparatus includes a radio communication unit, a resource adjustment unit, a first resource division unit, a detection unit, and a second resource division unit. The radio communication unit performs radio communication including at least a first downlink communication with a first mobile station. The resource adjustment unit determines radio resources to be allocated to the first downlink communication from a radio resource region shared with an adjacent base station. The first resource division unit limits, to a first radio resource segment which is a part of the radio resource region, radio resources in response to estimating that communication quality of the first downlink communication using the limited first radio resource segment is improved over the communication quality of the first downlink communication when using the entire range of the radio resource region that is shared with the adjacent base station. The detection unit detects execution of resource division by the adjacent base station for limiting radio resources used for a second downlink communication between the adjacent base station and a second mobile station to a second radio resource segment. The second resource division unit limits, to a third radio resource segment which is a part of the radio resource region and different from the second radio resource segment, radio resources allocatable to the first downlink communication by the resource adjustment unit in response to detection of the resource division by the detection unit.

According to yet another embodiment, a method includes:
 (a) estimating a communication quality of the first downlink communication when radio resources allocatable to the first downlink communication are limited to a part of a radio resource region shared with an adjacent base station;
 (b) limiting, to a first radio resource segment which is a part of the radio resource region, radio resources in response to estimating that communication quality of the first downlink communication using the limited first radio resource segment is improved over the communication quality of the first downlink communication when using the entire range of the radio resource region that is shared with the adjacent base station;
 (c) detecting execution of resource division by the adjacent base station for limiting radio resources used for a second downlink communication between the adjacent base station and a second mobile station to a second radio resource segment; and
 (d) limiting, to a third radio resource segment which is a part of the radio resource region and different from the second radio resource segment, radio resources allocatable to the first downlink communication in response to the detecting at step (c).

According to the above-mentioned embodiments of the present invention, it is possible to provide a radio communication system, a base station apparatus, a radio resource control method, and a program which are capable of avoiding a decrease in use efficiency of radio resources in the situation where the influence of ICI is small, and capable of avoiding unfairness in communication quality between adjacent cells in the situation where the influence of ICI is large.

BRIEF DESCRIPTION OF THE DRAWINGS

FIGS. 15A and 15B are diagrams showing an example of frequency resource division in Specific Example 1 according to the first to third illustrative embodiments;

FIGS. 18A and 18B are diagrams showing an example of frequency resource division in Specific Example 5 according to the first to third illustrative embodiments;

FIGS. 19A and 19B are diagrams showing an example of time resource division in Specific Example 6 according to the first to third illustrative embodiments;

ILLUSTRATIVE EMBODIMENTS

Figure 1:
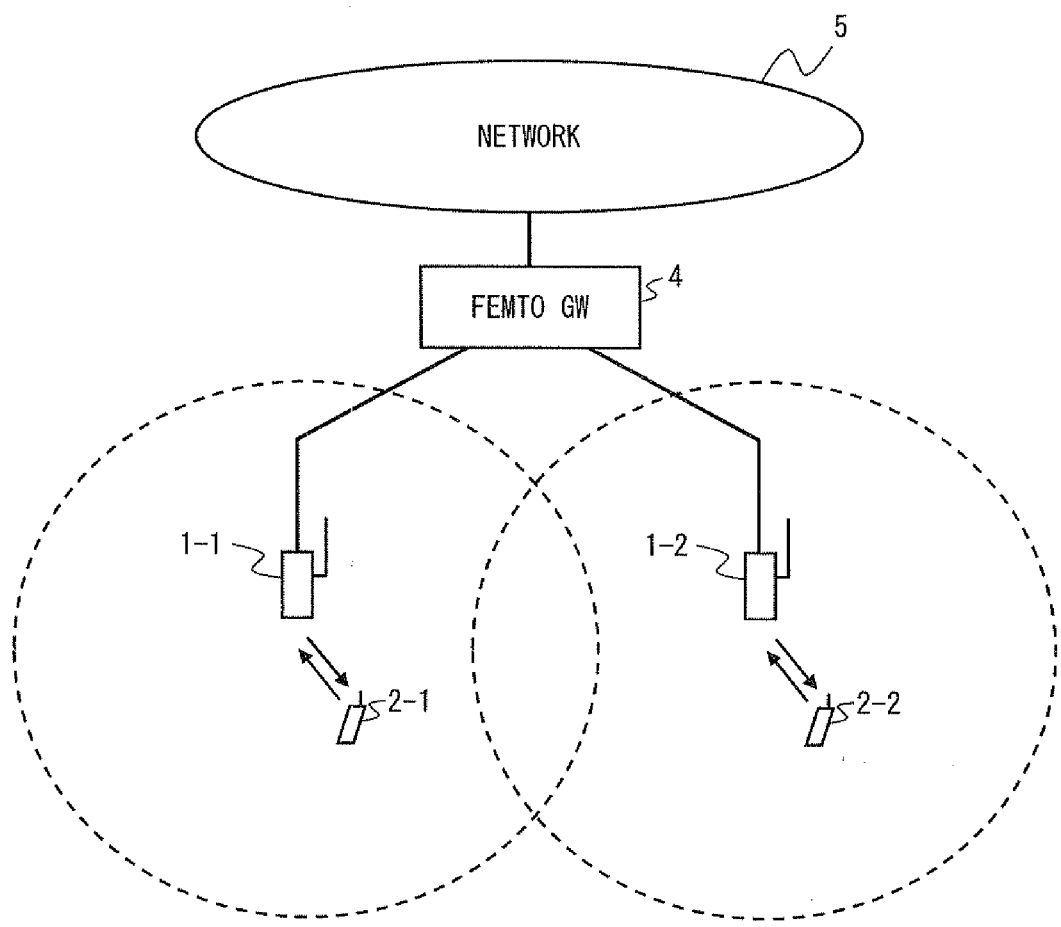
FIG. 1 is a configuration diagram of a radio communication system including first and second femtocell base stations according to a first illustrative embodiment of the present invention.

Hereinafter, specific embodiments of the present invention will be described in detail with reference to the drawings. Identical or corresponding elements are designated by identical reference numerals throughout the drawings, and redundant description thereof will be omitted except when necessary.

<First Illustrative Embodiment>

FIG. 1 shows a radio communication system according to a first illustrative embodiment of the present invention. The radio communication system includes a plurality of femtocell base stations 1 and at least one mobile station 2. The plurality of femtocell base stations 1 include a first femtocell base station 1-1 and a second femtocell base station 1-2, which have different roles to play. The first femtocell base station 1-1 sends information according to adjustment of radio resources of at least one of a transmission power, a frequency band, and a transmission time slot. The second femtocell base station 1-2 receives the information according to adjustment of radio resources. Each of the femtocell base stations 1-1 and 1-2 communicates with its own registered mobile station of the at least one mobile station 2. A mobile station 2-1 is a registered mobile station of the first femtocell base station 1-1, and a mobile station 2-2 is a registered mobile station of the second femtocell base station 1-2.

The femtocell base stations 1-1 and 1-2 utilize the same radio resource region. The radio resource region includes frequency resources and time resources. The first femtocell base station 1-1 performs transmission power control while sharing the radio resource region with the second femtocell base station 1-2, and radio resource division control for dividing the radio resource region into a plurality of segments and exclusively using any of the segments with the second femtocell base station 1-2 upon transmission of at least user data. For example, the first femtocell base station 1-1 switches the transmission power control sharing the entirety of a frequency band FB with the second femtocell base station 1-2, and the frequency division control for dividing the frequency band FB into a plurality of segments and exclusively using any of the segments with the second femtocell base station 1-2. As with the base station 1-1, the second femtocell base station 1-2 switches the transmission power control and the radio resource division control.

The first femtocell base station 1-1 performs switching to the radio resource division control from the transmission power control, upon estimating that an improvement in communication quality of downlink communication of the own registered mobile station 2-1 is expected in the case of performing the radio resource division control than in the case of performing the transmission power control. The second femtocell base station 1-2 also performs switching to the radio resource division control from the transmission power control in cooperation with switching of the first femtocell base station 1-1 to the radio resource division control.

Figure 2:
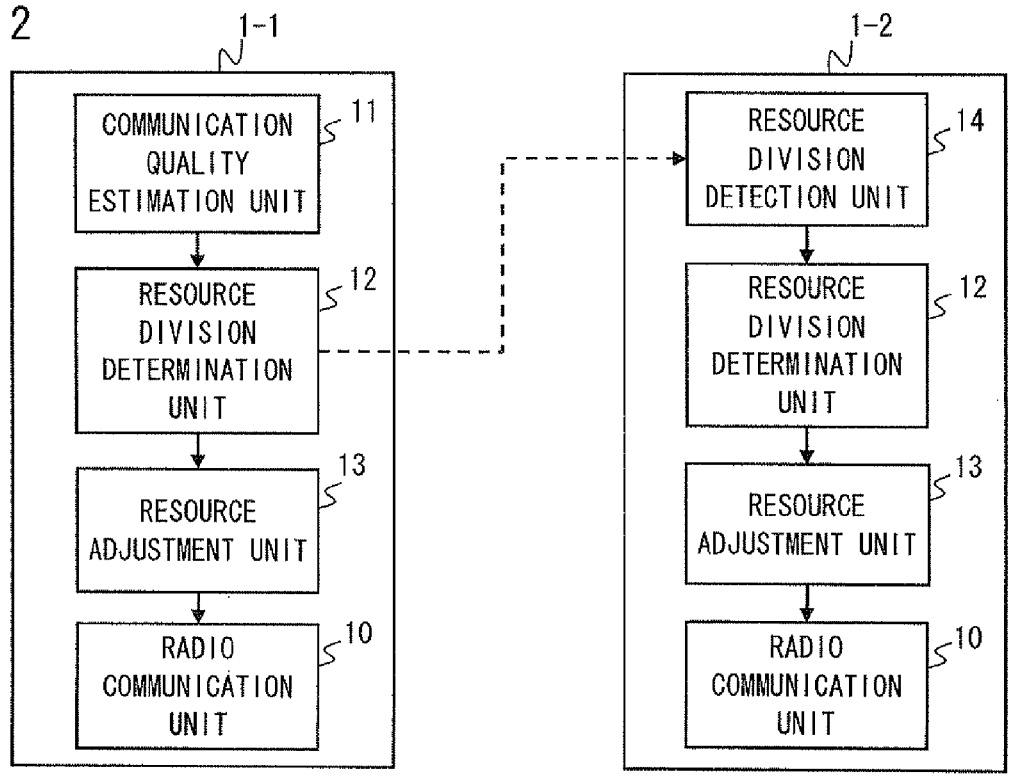
FIG. 2 is a block diagram showing illustrative configurations of the first and second femtocell base stations according to the first illustrative embodiment.

FIG. 2 is a block diagram showing an illustrative configuration of each of the first and second femtocell base stations. The first femtocell base station 1-1 includes a radio communication unit 10, a communication quality estimation unit 11, a resource division determination unit 12, and a resource adjustment unit 13. The second femtocell base station 1-2 includes the radio communication unit 10, a resource division detection unit 14, the resource division determination unit 12, and the resource adjustment unit 13.

The radio communication unit 10 receives an uplink signal from the mobile station 2 through a receiving antenna. Received data is transmitted to a femto GW 4. Further, the radio communication unit 10 generates a downlink signal including control data and user data received from the femto GW 4, and transmits the downlink signal through a transmitting antenna. A base station side transceiver unit adapted to a radio system such as W-CDMA, E-UTRA, or IEEE 802.16m can be used as the communication unit 10.

The communication quality estimation unit 11 arranged in the first femtocell base station 1-1 estimates a downlink communication quality in the registered mobile station 2-1 before and after the resource division, assuming that the total amount of radio resources allocatable to the down link communication with the registered mobile station 2-1 is reduced by switching to the radio resource division control from the transmission power control. The estimated downlink communication quality can be a throughput or an SINR, for example. An estimation result of the communication quality is used for determination of whether to switch from the transmission power control to the radio resource division control in the resource division determination unit 12. In the radio resource division control, frequency resources (e.g. a frequency band) may be divided, or time resources (e.g. time slots) may be divided.

The resource division determination unit 12 arranged in the first femtocell base station 1-1 determines whether to perform switching to the radio resource division control from the transmission power control based on the estimation result of the communication quality obtained by the communication quality estimation unit 11. In other words, the resource division determination unit 12 determines whether to limit the total amount of radio resource allocatable to the downlink communication with the registered mobile station 2-1 and use the limited radio resource exclusively with the second femtocell base station 1-2. Specifically, the resource division determination unit 12 determines to perform switching to the radio resource division control from the transmission power control, upon estimating that an improvement in the downlink communication quality is expected in the case of reducing the total amount of radio resources allocatable to the downlink communication with the registered mobile station 2-1 and using the reduced (limited) radio resource segment exclusively with the second femtocell base station 1-2. The resource adjustment unit 13 and the resource division detection unit 14 arranged in the second femtocell base station are notified of a determination result of the resource division determination unit 12.

When it is determined that the radio resource division control should be carried out, the resource adjustment unit 13 arranged in the first femtocell base station 1-1 performs switching to the radio resource division control to thereby reduce the total amount of radio resources allocatable to the downlink communication with the registered mobile station 2-1. On the other hand, when it is determined that the radio resource division control should not be carried out, the resource adjustment unit 13 continues the transmission power control. Further, when it is determined that the radio resource division control should not be carried out after switching to the radio resource division control, the resource adjustment unit 13 performs switching back to the transmission power control from the radio resource division control, so that the total amount of radio resources allocatable to the downlink communication with the registered mobile station 2-1 gets back to that before the change.

The resource division detection unit 14 arranged in the second femtocell base station 1-2 detects the determination result of the resource division determination unit 12 arranged in the first femtocell base station 1-1. The resource division detection unit 14 may autonomously detect the transition of the first femtocell base station 1-1 to the radio resource division control. Alternatively, the resource division detection unit 14 may detect the transition of the first femtocell base station 1-1 to the radio resource division by receiving, from the first femtocell base station 1-1, information indicating switching to the radio resource division control. The resource division determination unit 12 arranged in the second femtocell base station 1-2 is notified of a detection result of the resource division detection unit 14.

When the first femtocell base station 1-1 has determined to switch to the radio resource division control, based on the detection result of the resource division detection unit 14, the resource division determination unit 12 arranged in the second femtocell base station 1-2 determines to perform switching to the radio resource division control from the transmission power control. In the case of performing the radio resource division control, the second femtocell base station 1-2 reduces the total amount of radio resources allocatable to the downlink communication with the registered mobile station 2-2, and uses the reduced (limited) radio resource segment exclusively with the first femtocell base station 1-1.

The resource adjustment unit 13 arranged in the second femtocell base station 1-2 performs switching between the transmission power control and the radio resource division control based on the determination result of the resource division determination unit 12, like the resource adjustment unit 13 arranged in the first femtocell base station 1-1.

Figure 3:
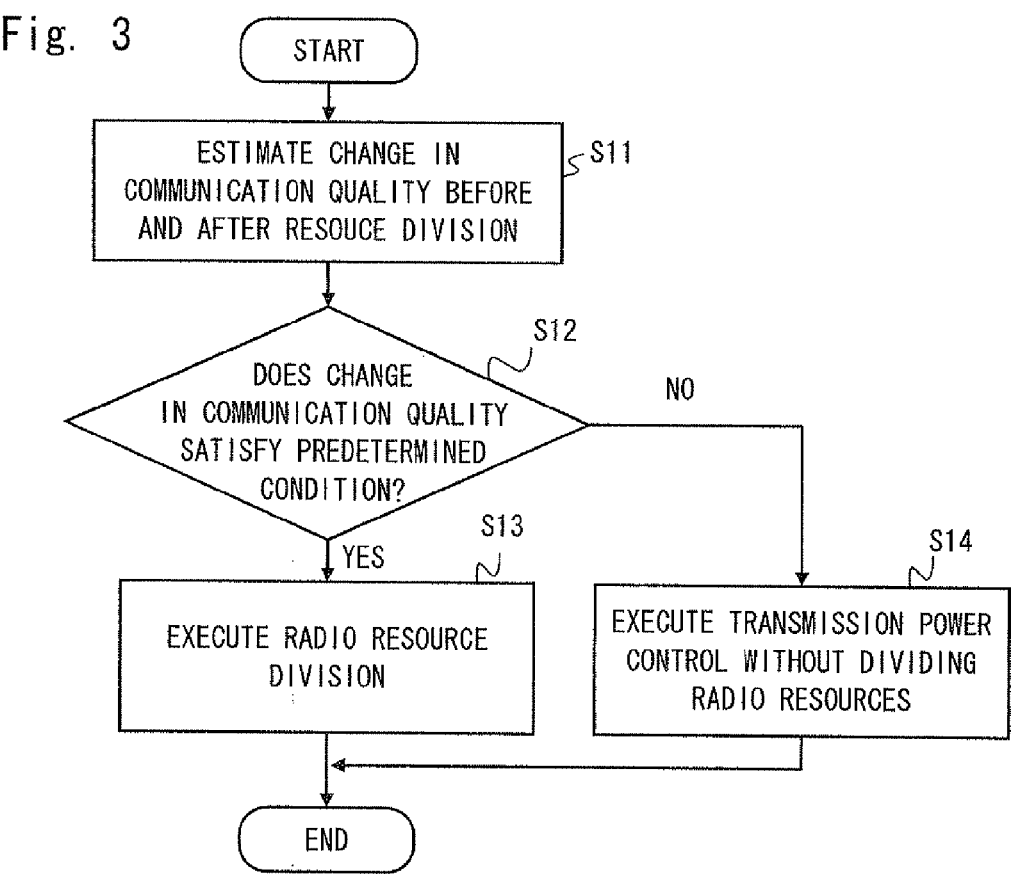
FIG. 3 is a flowchart showing a control procedure of the first femtocell base station according to the first illustrative embodiment.

Hereinafter, operations of the femtocell base stations 1-1 and 1-2 according to the first illustrative embodiment will be described. FIG. 3 is a flowchart showing an illustrative operation of the first femtocell base station 1-1. In operation S11, the communication quality estimation unit 11 of the first femtocell base station 1-1 estimates the amount of improvement in the downlink communication quality in the registered mobile station 2-1 before and after the division of the radio resource region, assuming that the resource division control is carried out.

In operation S12, the resource division determination unit 12 of the first femtocell base station 1-1 determines whether a change in the communication quality of the registered mobile station 2-1 satisfies a predetermined condition. The predetermined condition may be that the amount of improvement in the communication quality is equal to or greater than a predetermined value, for example.

In operation S13, when the determination result in operation S12 is YES (when an improvement in the communication quality is expected by the radio resource division control), the resource adjustment unit 13 of the first femtocell base station 1-1 divides the radio resource region and reduces the total amount of radio resources allocatable to the downlink communication with the registered mobile station 2-1.

In operation S14, when the determination result in operation S12 is NO (when an improvement in the communication quality cannot be expected by the radio resource division control), the resource adjustment unit 13 of the first femtocell base station 1-1 executes the transmission power control without reducing the total amount of radio resources allocatable to the downlink communication with the registered mobile station 2-1.

Figure 4:
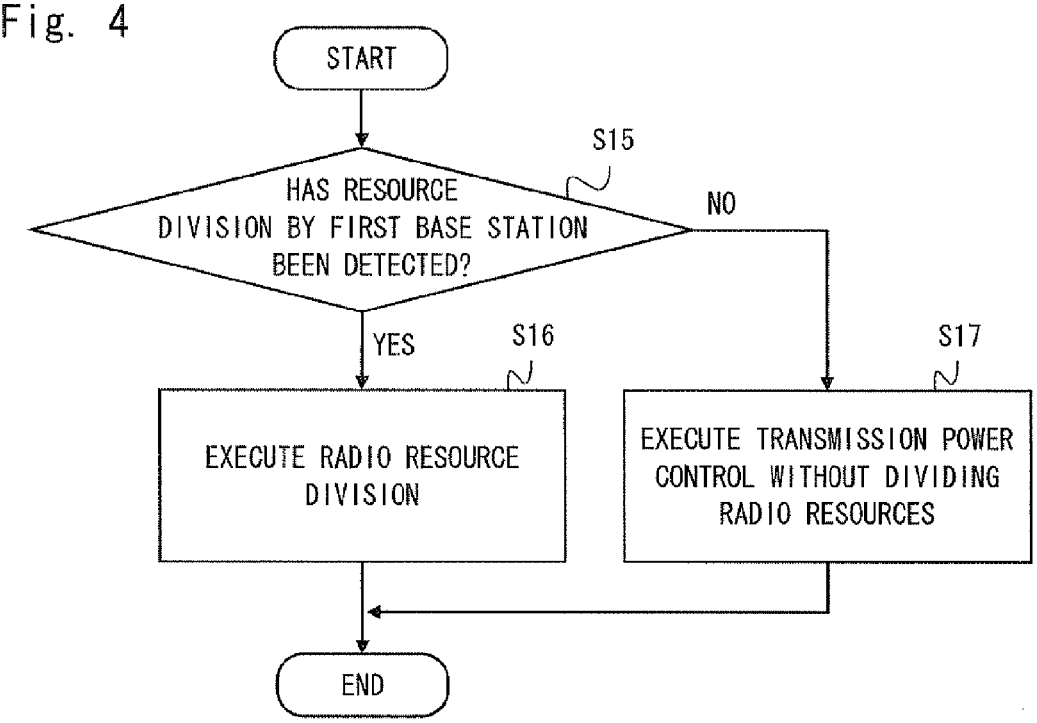
FIG. 4 is a flowchart showing a control procedure of the second femtocell base station according to the first illustrative embodiment.

FIG. 4 is a flowchart showing an illustrative operation of the second femtocell base station 1-2. In operation S15, the resource division detection unit 14 of the second femtocell base station 1-2 detects information about the division of the radio resource region by the first femtocell base station 1-1. The resource division determination unit 12 of the second femtocell base station 1-2 determines whether the first femtocell base station 11 has executed radio resource division, based on the detection result of the resource division detection unit 14.

In operation S16, when the determination result in operation S15 is YES (when the first femtocell base station 1-1 has executed resource division), the resource adjustment unit 13 of the second femtocell base station 1-2 divides the radio resource region. At this time, the second femtocell base station 1-2 uses a radio resource segment different from the radio resource segment used by the first femtocell base station 1-1 after the division. For example, in the case of dividing frequency resources (e.g. a frequency band FB), the second femtocell base station 1-2 uses a partial band different from a partial band used by the first femtocell base station 1-1 after the resource division, among a plurality of partial bands included in the frequency band FB. In the case of dividing time resources including plural sets of time slots, the second femtocell base station 1-2 uses a set of time slots different from a set of time slots used by the first femtocell base station 1-1 after the resource division.

In operation S17, when the determination result in operation S15 is NO (when the first femtocell base station 1-1 has not executed resource division), the resource adjustment unit 13 of the second femtocell base station 1-2 executes the transmission power control without reducing the total amount of radio resources allocatable to the downlink communication with the registered mobile station 2-2.

As described above, the first and second femtocell base stations 1-1 and 1-2 according to the first illustrative embodiment execute the transmission power control using the entire radio resource region that is shared between the femtocell base stations 1-1 and 1-2, when the communication quality is not deteriorated in the first femtocell base station 1-1. Accordingly, when the communication quality is not deteriorated in the first femtocell base station 1-1 and when fairness of the communication quality between the femtocell base stations 1-1 and 1-2 can be ensured, both of the femtocell base stations 1-1 and 1-2 can increase the downlink throughput. In other words, a decrease in use efficiency of the radio resources can be avoided in the situation where the influence of inter-cell interference (ICI) is small.

Meanwhile, in the transmission power control using the same radio resource region with the second femtocell base station 1-2, when deterioration in the communication quality occurs in the first femtocell station 1-1 and when it is estimated that an improvement in the communication quality of the first femtocell base station 1-1 is expected in the case of performing the radio resource division control, the first femtocell base station 1-1 executes the radio resource division control using a divided radio resource segment of the radio resource region. Also the second femtocell base station 1-2 executes the radio resource division control using a radio resource segment different from that of the femtocell base station 1-1, in response to the switching of the first femtocell base station 1-1 to the radio resource division control. That is, in the situation where the communication quality of the femtocell base station 1-1 decreases due to ICI from the femtocell base station 1-2, not only the first femtocell base station 1-1 but also the base station 1-2 reduces the total amount of radio resources allocatable to the downlink communication with the registered mobile station. Therefore, in the situation where the influence of ICI is large, the deterioration in the communication quality of the first femtocell base station 1-1 can be alleviated and unfairness in the communication quality between adjacent cells can be avoided.

Processing for switching between the transmission power control and the radio resource division control by the femtocell base stations 1-1 and 1-2 as described above may be achieved using semiconductor processing equipment such as an ASIC (Application Specific Integrated Circuit) or a DSP (Digital Signal Processor). The processing may be executed by causing a computer, such as a microprocessor, to execute a program. Specifically, a program including an instruction set for causing a computer to execute an algorithm shown in FIG. 3 or 4 may be prepared and provided to the computer.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R, CD-R/W, and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a radio communication line.

<Second Illustrative Embodiment>

In a second illustrative embodiment of the present invention, a description will be given of an illustrative operation in which the first femtocell base station 1-1 determines to execute the radio resource division control based on a communication quality, and an illustrative operation in which the second femtocell base station 1-2 detects radio resource division in the first femtocell base station 1-1, as described in the first illustrative embodiment. The first femtocell base station 1-1 according to the second illustrative embodiment acquires reception qualities of adjacent base stations (including the second femtocell base station, a macro base station, and other base stations) which is measured by its own registered mobile station 2-1, and estimates a throughput as a communication quality of a downlink communication with the registered mobile station 2-1. Then, when an improvement in the throughput of the downlink communication with the registered mobile station 2-1 is expected in the case of performing the radio resource division, the first femtocell base station 1-1 switches the radio resource control from the transmission power control to the radio resource division control. The second femtocell base station 1-2 according to the second illustrative embodiment detects that the first base station 1-1 has executed radio resource division, by using a measurement result of reception quality obtained by its own registered mobile station 2-2.

Figure 5:
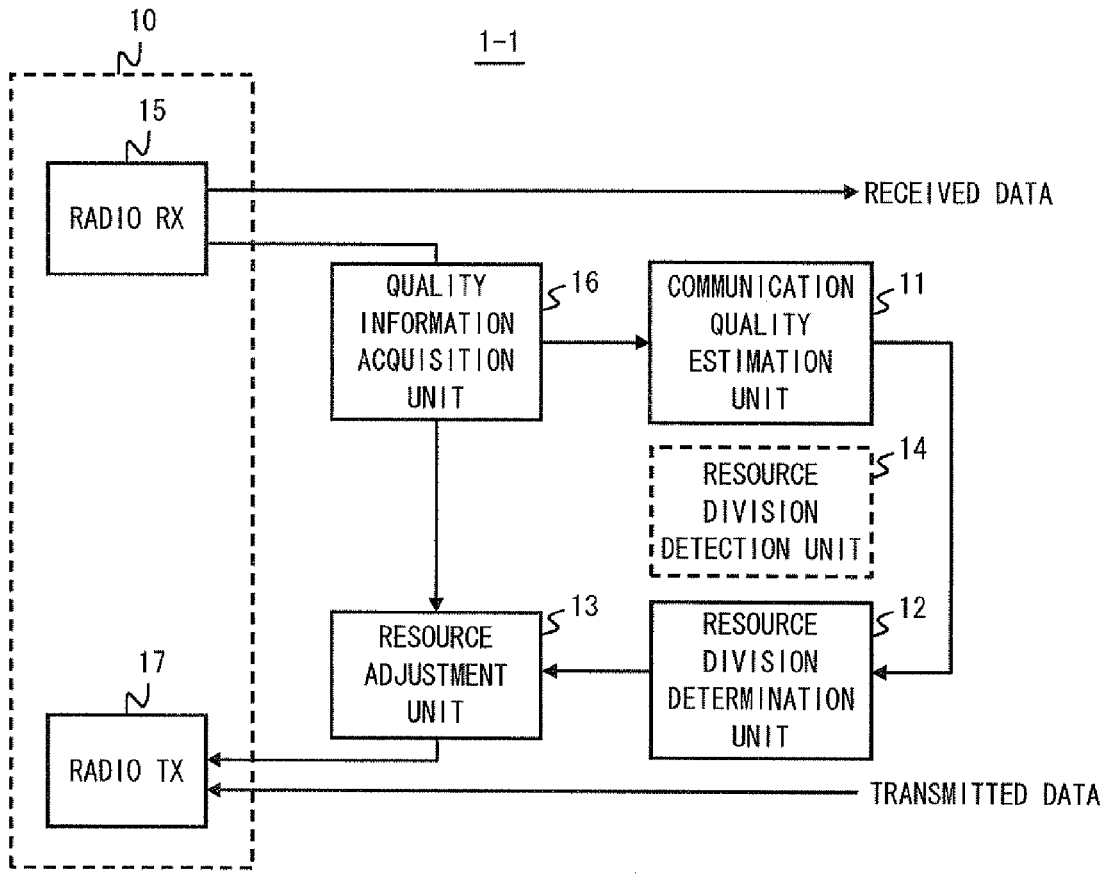
FIG. 5 is a block diagram of a first femtocell base station according to a second illustrative embodiment of the present invention.
Figure 6:
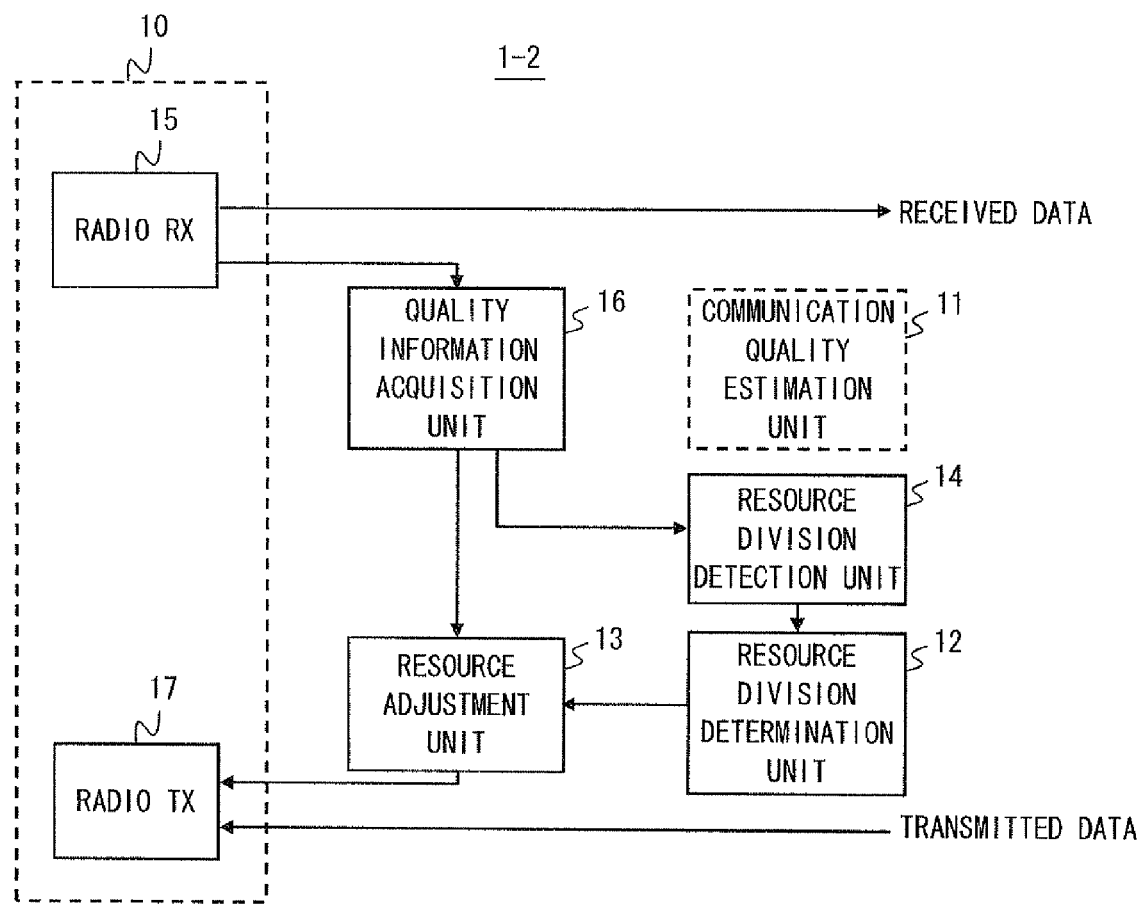
FIG. 6 is a block diagram of a second femtocell base station according to the second illustrative embodiment.

FIG. 5 is a block diagram showing an illustrative configuration of the first femtocell base station 1-1 according to the second illustrative embodiment. FIG. 6 is a block diagram showing an illustrative configuration of the second femtocell base station 1-2 according to the second illustrative embodiment. In the illustrative configurations shown in FIGS. 5 and 6, the femtocell base stations 1-1 and 1-2 include the same components. In the examples shown in FIGS. 5 and 6, also the first femtocell base station 1-1 can perform switching to the radio resource division control in response to the switching of the second femtocell base station 1-2 to the radio resource division control based on the downlink communication quality of the mobile station 2-2. A description is given below of an example in which the first femtocell base station 1-1 determines to perform switching to the radio resource division control and the second femtocell base station 1-2 then performs switching to the radio resource division control, like in the first illustrative embodiment.

The radio communication unit 10 includes a radio reception unit 15 and a radio transmission unit 17. The radio reception unit 15 is a reception unit, at a base station side, adapted to a radio system such as W-CDMA, E-UTRA, or IEEE 802.16m. The radio transmission unit 17 is a transmission unit, at a base station side, adapted to a radio system such as W-CDMA, E-UTRA, or IEEE 802.16m.

A quality information acquisition unit 16 arranged in the first femtocell base station 1-1 acquires a measurement result of a downlink reception quality measured by the registered mobile station 2-1 during communication with the base station 1-1. In the case of W-CDMA, the downlink reception quality can be a reception power (RSCP: Received Signal Code Power) or a reception quality (Ec/No) upon reception of a pilot signal transmitted using the entire frequency band. In the case of E-UTRA, the downlink reception quality can be a reception power (RSRP: Reference Signal Received Power) or a reception quality (RSRQ: Reference Signal Received Quality) upon reception of a reference signal transmitted per resource element obtained by dividing a frequency band and time into small segments. A higher-level network 5 notifies the base station 1 and the mobile station 2 of settings of a downlink reception quality to be measured by the mobile station 2, a reporting cycle of the mobile station 2, and the like. Such reception quality information is used for estimation of the communication quality by the communication quality estimation unit 11, and is further used for control of the reference signal, a control channel, a data channel, and a maximum transmission power set value by the resource adjustment unit 13.

The registered mobile station 2-1 measures a downlink SINR, and reports the measured downlink SINR to the first femtocell base station 1-1. The SINR is discretized into a CQI (Channel Quality Indicator) and is transmitted to the first femtocell base station 1-1 by using an uplink control signal transmitted from the mobile station 2-1. A method of generating the CQI may be selected from a plurality of methods. For example, a single CQI is generated for the entire band, or a CQI is generated for each divided small bands. The quality information acquisition unit 16 of the first femtocell base station 1-1 acquires a measurement result of the downlink SINR notified from the mobile station 2-1. The first femtocell base station 1-1 uses the downlink SINR as reference information when allocating the radio resource to the mobile station 2-1. In other words, measurement information of the downlink SINR is transmitted to the resource adjustment unit 13 and is used in scheduling of the radio resource for the mobile station 2-1.

The communication quality estimation unit 11 arranged in the first femtocell base station 1-1 estimates the downlink throughput of the registered mobile station 2-1, assuming that the total amount of radio resources allocatable to the downlink communication with the registered mobile station 2-1 is reduced by switching to the radio resource division control from the transmission power control, by using the downlink reception quality information acquired from the mobile station 2-1. An illustrative method of estimating the throughput will be described later.

The resource division determination unit 12 arranged in the first femtocell base station 1-1 determines whether to perform switching to the radio resource division control, based on an estimation result of the downlink throughput by the communication quality estimation unit 11. The condition for switching to the radio resource division control from the transmission power control may be that the downlink throughput exceeds a predetermined threshold and is higher than the throughput obtained before the radio resource division, assuming that the radio resource division has been executed. The resource adjustment unit 13 is notified of the determination result of the resource division determination unit 12.

The resource adjustment unit 13 arranged in the first femtocell base station 1-1 performs the transmission power control or radio resource division control depending on the determination result of the resource division determination unit 12. As disclosed in PTL1, for example, the transmission power control may be performed such that the downlink reception quality, such as the RSRP or RSRQ, in the mobile station 2-1, gets close a preset target value. Upon transmission of user data to the mobile station 2-1, the resource adjustment unit 13 executes scheduling of downlink resource blocks to be allocated to the mobile station 2-1 based on the CQI notified from the mobile station 2-1 and the determination result of the resource division determination unit 12. In other words, the resource adjustment unit 13 determines a set of resource blocks allocatable to the downlink communication with the mobile station 2-1 according to the determination result of the resource division determination unit 12. The resource adjustment unit 13 determines resource blocks corresponding to a transmittable rate from the set of allocatable resource blocks, with reference to the CQI.

Next, an illustrative configuration of the second femtocell base station 1-2 shown in FIG. 6 will be described. The functions and operations of the resource adjustment unit 13, the radio reception unit 15, the quality information acquisition unit 16, and the radio transmission unit 17 may be similar to those of the example shown in FIG. 5.

The resource division detection unit 14 arranged in the second femtocell base station 1-2 autonomously detects the determination result of the resource division determination unit 12 in the first femtocell base station 1-1. A specific detection method as described below may be employed. First, the resource division detection unit 14 acquires CQI from the reception quality information acquisition unit 16 at a predetermined sub-frame timing. The CQI represents a reception quality per downlink resource block measured by the mobile station 2-2. Next, the resource division detection unit 14 compares a newly acquired reception quality with a minimum value of at least one reception quality obtained at previous measurement timings, and calculates an increase Δ in reception quality. Assume herein that the minimum value of at least one reception quality obtained at previous measurement timings is measured before the first femtocell base station 1-1 executes radio resource division. Lastly, when the number of resource blocks in which the increase Δ in reception quality exceeds a threshold Th1 is equal to or greater than a predetermined number, the resource division detection unit 14 detects that the first femtocell base station 1-1 has executed radio resource division. This is because if the first femtocell base station 1-1 has executed radio resource division, ICI from the first femtocell base station 1-1 is reduced, which is observed as an improvement in reception quality in the second femtocell base station 1-2. The resource division determination unit 12 is notified of the detection result of the resource division detection unit 14.

The resource division determination unit 12 arranged in the second femtocell base station 1-2 determines to perform switching to the radio resource division control from the transmission power control upon detection that the first femtocell base station 1-1 has executed radio resource division. The resource adjustment unit 13 is notified of the determination result of the resource division determination unit 12.

In the following description, an illustrative method of estimating the downlink throughput in the communication quality estimation unit 11 will be described. First, the communication quality estimation unit 11 performs, at the predetermined sub-frame timing, a simplified calculation of a downlink SINR (hereinafter expressed as "SINR_1") in the mobile station 2-1 before the radio resource division is carried out (that is, a term in which the transmission power control is carried out) in accordance with Expression (1) using the RSRP as reception quality information.

$$\text{SINR\_1} = \frac{RSRP_i}{\sum_{k \neq i} RSRP_k + N} \quad (1)$$

In Expression (1), the first femtocell base station 1-1, which functions as a serving base station of the mobile station 2-1, is expressed with a subscript "i", and adjacent base stations as interfering stations are expressed with a subscript "k". The adjacent base stations as interfering stations include the second femtocell base station, a macro base station, and other adjacent base stations. N represents thermal noise per resource element. The sum appearing in the denominator of Expression (1) indicates the sum of RSRPs of interference waves from the interfering stations using the same frequency band as that of the first femtocell base station 1-1. To be exact, it is necessary to calculate interference in consideration of overlapping per resource element. However, the interference is expressed as the sum appearing in the denominator of Expression (1), since the RSRP is defined as an average in the entire frequency band and it can be assumed that transmission power of a data channel or a control channel of adjacent base station using a radio resource that overlaps the reference signal of the first femtocell base station 1-1 is the same as the reference signal.

Next, a throughput (hereinafter expressed as "TH1") before the radio resource division is carried out is calculated using Expression (2).

$$TH1 = W1 \cdot MIN(\alpha \cdot \log_2(1+SINR\_1), Thr_{Max}) \quad (2)$$

Expression (2) is based on the Shannon limit which provides the theoretical limit of the throughput at a predetermined SINR. The unit of the throughput TH1 is Mbps (bits per second). W1 indicates a frequency band which is expressed in units of MHz. $\alpha$ represents an attenuation factor associated with the implementation, and takes any value in the range of 0 to 1. ThrMax represents a maximum value of the throughput that can be achieved in a predetermined system, and is expressed in units of bps/Hz. MIN (x, y) represents a function for selecting the smaller one of the values x and y.

Next, SINR (hereinafter expressed as "SINR_2") is calculated using Expression (3), assuming that the radio resource division has been executed.

$$\text{SINR\_2} = \frac{RSRP_i}{\sum_{k \neq i, j} RSRP_k + N} \quad (3)$$

In Expression (3), the base station that causes a maximum interference among the adjacent base stations is expressed with a subscript "j". In this illustrative embodiment, the base station "j" corresponds to the second femtocell base station 1-2. Expression (3) differs from Expression (1) in that the contribution of the interference from the base station "j" is removed from the sum in the denominator. This is because it is assumed that the first femtocell base station 1-1 uses, in radio resource division, a radio resource segment different from the radio resource segment used by the base station that causes the maximum interference.

Next, a throughput (hereinafter referred to as "TH2") is calculated using Expression (4), assuming that the radio resource division has been executed.

$$TH2 = W2 \cdot MIN(\alpha \cdot \log_2(1+SINR\_2), Thr_{max}) \quad (4)$$

W2 represents a frequency band obtained after execution of the radio resource division, and is expressed in units of MHz. The use of Expressions (1) to (4) described above enables estimation of the downlink throughput before and after the radio resource division.

Figure 7:
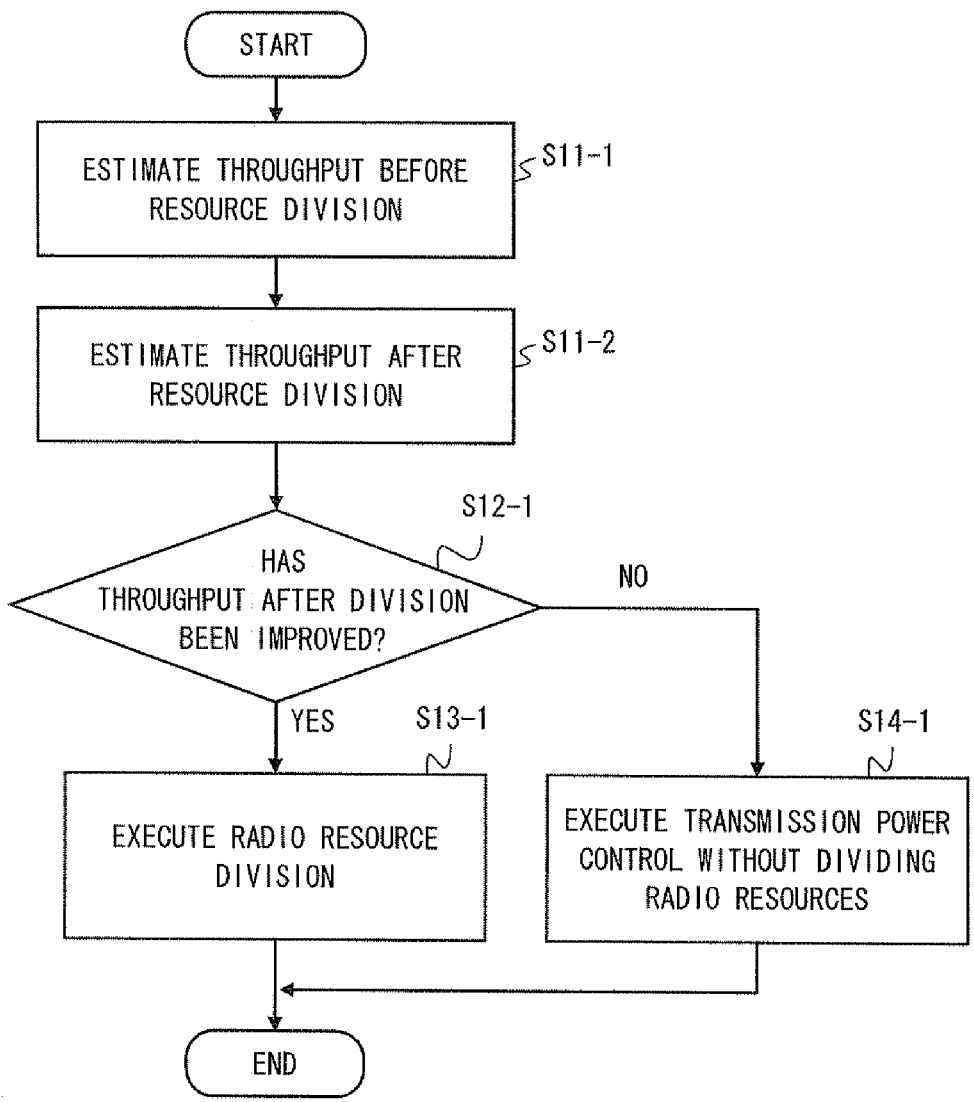
FIG. 7 is a flowchart showing a control procedure of the first femtocell base station according to the second illustrative embodiment.

In the following description, the operation according to the second illustrative embodiment will be described. An illustrative operation of the first femtocell base station 1-1 at the predetermined sub-frame timing will be described with reference to the flowchart of FIG. 7. Note that operations in FIG. 7 are designated by reference symbols, which respectively correspond to the reference symbols used in the flowchart of FIG. 3, with sub-numbers affixed.

In operation S11-1, the communication quality estimation unit 11 estimates the downlink throughput in the state where the transmission power control has been executed before the radio resource division. This estimation may use the above-mentioned Expressions (1) and (2).

In operation S11-2, the communication quality estimation unit 11 estimates the downlink throughput assuming that the total amount of radio resource allocatable to the downlink communication with the mobile station 2-1 is reduced by performing switching to the radio resource division control from the transmission power control. This estimation may use the above-mentioned Expressions (3) and (4).

In operation S12-1, the resource division determination unit 12 determines whether to perform switching to the radio resource division control from the transmission power control by using estimated values of throughputs obtained before and after the radio resource division. The condition for switching to the radio resource division control may be that the throughput TH2 is improved than the throughput TH1. Specifically, the condition for switching to the radio resource division control may be that the throughput TH2 exceeds a predetermined value "A" higher than the throughput TH1.

In operation S13-1, when the determination result in operation S12-1 is YES (when an improvement in the throughput is expected by the radio resource division), the resource adjustment unit 12 executes radio resource division, and reduces the total amount of radio resources allocatable to the downlink communication with the registered mobile station 2-1. For example, in the case of dividing the frequency resource, the first femtocell base station 1-1 may use any partial band among a plurality of partial bands included in the frequency band FB, or may use a partial band whose reception quality is estimated to be relatively satisfactory, given the downlink reception quality per resource block.

In operation S14-1, when the determination result in operation S12-1 is NO (when an improvement in the throughput cannot be expected by the radio resource division), the resource adjustment unit 12 executes the transmission power control without reducing the total amount of radio resources allocatable to the downlink communication with the registered mobile station 2-1. If the radio resource division control has already been executed, the resource adjustment unit 12 performs switching back to the transmission power control from the radio resource division control.

Figure 8:
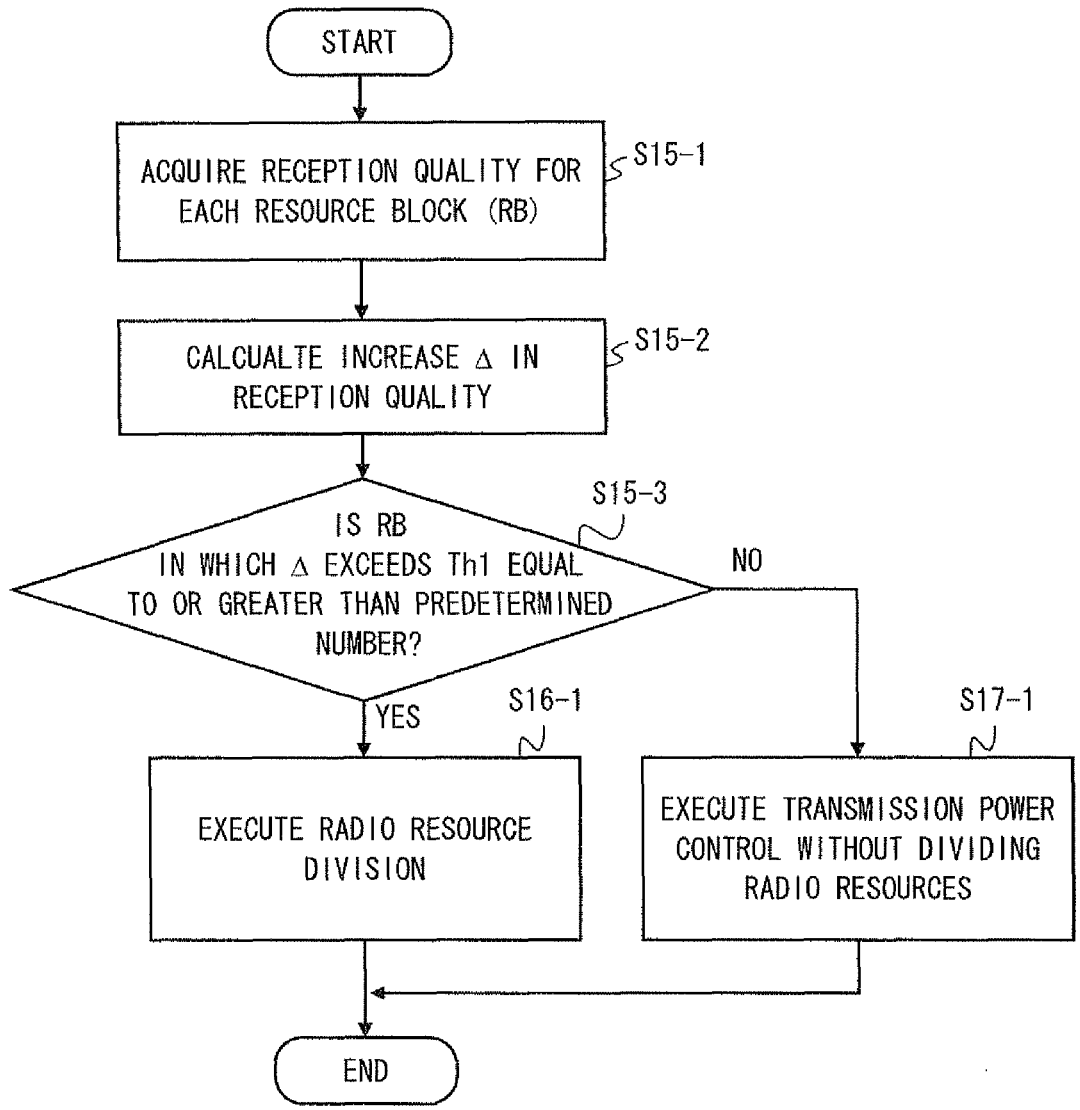
FIG. 8 is a flowchart showing a control procedure of the second femtocell base station according to the second illustrative embodiment.

Next, an illustrative operation of the second femtocell base station 1-2 at the predetermined sub-frame timing will be described with reference to the flowchart of FIG. 8. Note that operations in FIG. 8 are designated by reference symbols, which respectively correspond to the reference symbols used in the flowchart of FIG. 4, with sub-numbers affixed.

In operation S15-1, the resource division detection unit 14 acquires, from the quality information acquisition unit 16, a measurement result of reception quality in the mobile station 2-2 for each of downlink resource blocks.

In operation S15-2, the resource division detection unit 14 calculates the increase Δ in reception quality against the previous measurement timing for each of downlink resource blocks.

In operation S15-3, the resource division detection unit 14 determines whether the number of resource blocks in which the increase Δ in reception quality exceeds the threshold Th1 is equal to or greater than the predetermined number.

In operation S16-1, when the determination result in operation S15-3 is YES, the resource division determination unit 12 determines to execute the radio resource division control. Then, the resource adjustment unit 13 executes the radio resource division control. At this time, the second femtocell base station 1-2 may determine that radio resource segments (partial bands in the case of dividing the frequency resources) corresponding to the resource blocks that satisfy the condition in operation S15-3 are segments that are not used by the first femtocell base station 1-1 after the radio resource division, and may use these segments.

In operation S17-1, when the determination result in operation S15-3 is NO, the resource division determination unit 12 determines to execute the transmission power control. The resource adjustment unit 13 executes the transmission power control. If the radio resource division control has already been executed, the resource adjustment unit 13 performs switching back to the transmission power control from the radio resource division control.

As described above, the femtocell base station 1-1 according to the second illustrative embodiment uses the throughput as the downlink communication quality, and executes the radio resource division control when an improvement in the downlink throughput is expected after the radio resource division. The femtocell base station 1-2 can autonomously detect that the base station 1-1 has executed radio resource division, by using the amount of improvement in the downlink reception quality as an index. Therefore, according to the femtocell base stations 1-1 and 1-2 of the second illustrative embodiment, a decrease in use efficiency of the radio resource can be avoided in the situation where the influence of ICI is small, and unfairness in the communication quality between adjacent cells can be avoided in the situation where the influence of ICI is large, as in the first illustrative embodiment described above.

Additionally, as shown in FIGS. 5 and 6, the femtocell base stations 1-1 and 1-2 may be configured such that the operations thereof can be replaced with each other by sharing the configurations of the main parts of the femtocell base stations 1-1 and 1-2. Consequently, also the first femtocell base station 1-1 can perform switching to the radio resource division control in response to the switching of the second femtocell base station 1-2 to the radio resource division control based on the downlink communication quality of the mobile station 2-2.

<Third Illustrative Embodiment>

In a third illustrative embodiment of the present invention, a description is given of another illustrative operation in which the first femtocell base station 1-1 determines to execute the radio resource division control based on a communication quality and another illustrative operation in which the second femtocell base station 1-2 detects radio resource division in the first femtocell base station 1-1. The third illustrative embodiment differs from the second illustrative embodiment in that the first femtocell base station 1-1 notifies the second femtocell base station 1-2 of switching of a radio resource control, through the femto GW 4. Upon receiving the information indicating that the first femtocell base station 1-1 has executed radio resource division, through the femto GW 4, the second femtocell base station 1-2 performs switching to the radio resource division control from the transmission power control.

Figure 9:
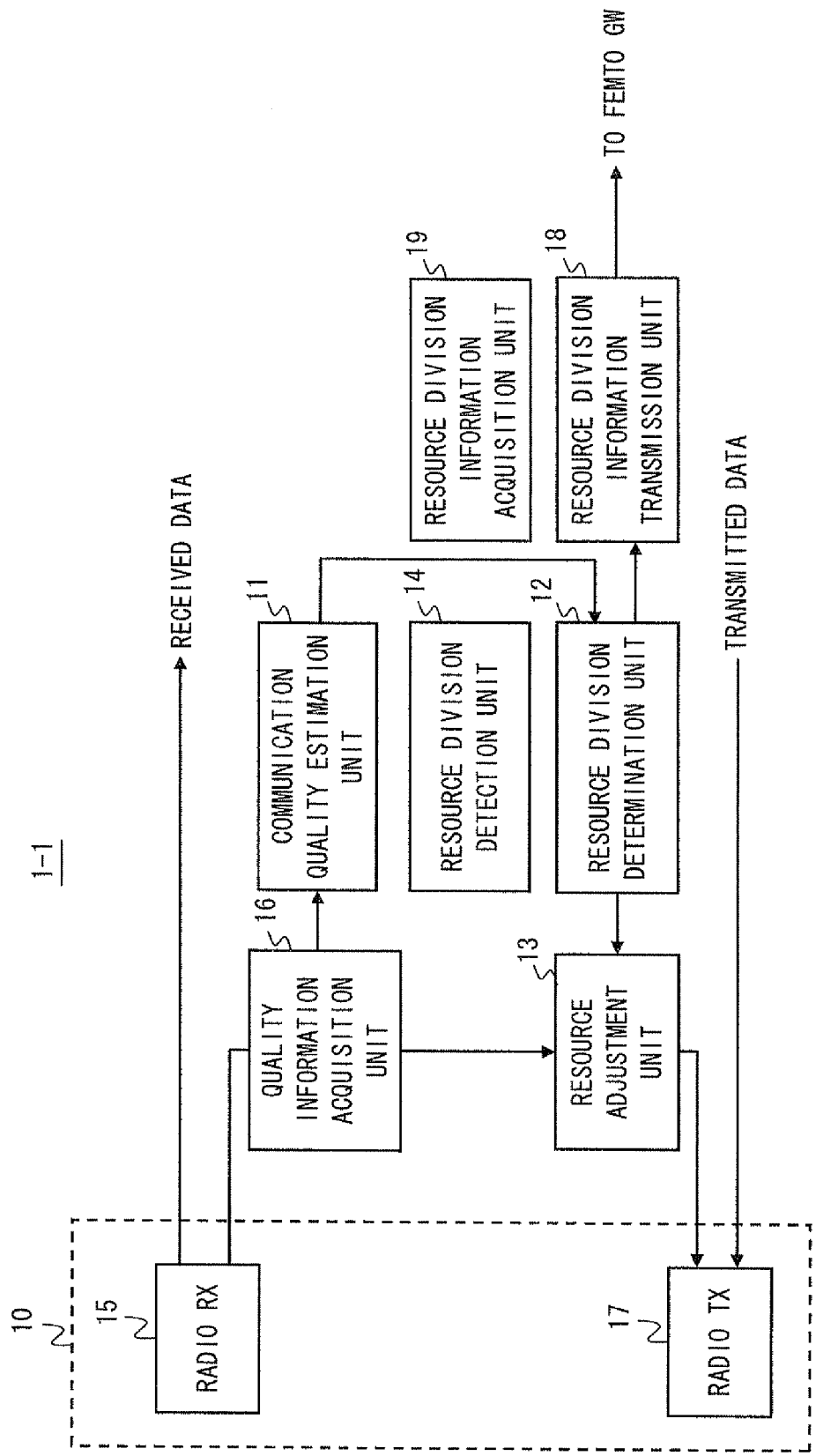
FIG. 9 is a block diagram of a first femtocell base station according to a third illustrative embodiment of the present invention.
Figure 10:
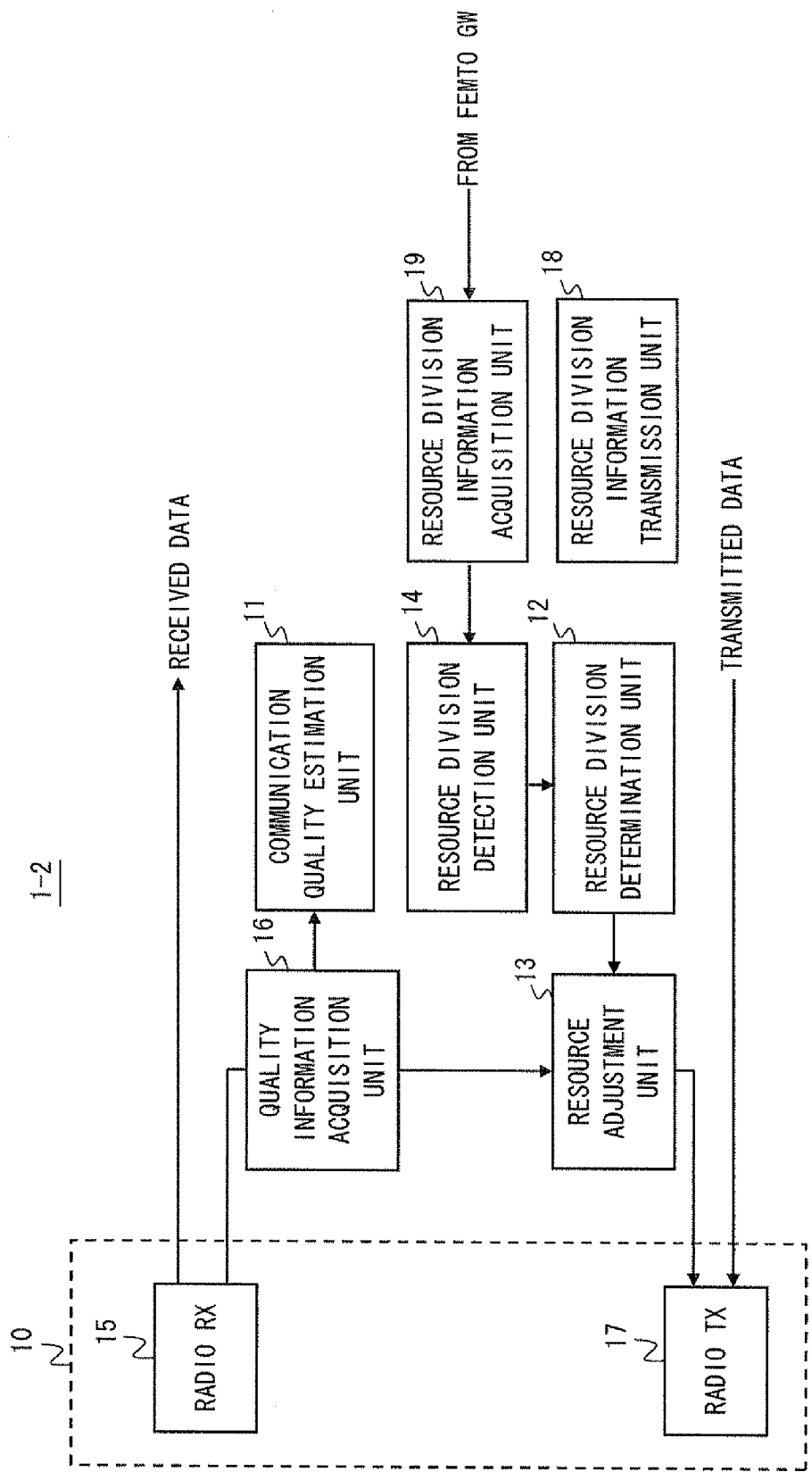
FIG. 10 is a block diagram of a second femtocell base station according to the third illustrative embodiment.

FIG. 9 is a block diagram showing an illustrative configuration of the first femtocell base station 1-1 according to the third illustrative embodiment. FIG. 10 is a block diagram showing an illustrative configuration of the second femtocell base station 1-2 according to the third illustrative embodiment. In the illustrative configurations shown in FIGS. 9 and 10, the femtocell base stations 1-1 and 1-2 include the same components. The configuration examples shown in FIGS. 9 and 10 differ from those shown in FIGS. 5 and 6 in that a resource division information transmission unit 18 and a resource division information acquisition unit 19 are provided. The other components shown in FIGS. 9 and 10 may be similar to those shown in FIGS. 5 and 6.

The resource division information transmission unit 18 arranged in the first femtocell base station 1-1 receives a determination result from the resource division determination unit 12, and creates resource division information. The resource division information includes information indicating whether the first femtocell base station 1-1 is executing the transmission power control or the radio resource division control. The resource division information transmission unit 18 then transmits the resource division information to the femto GW 4. At this time, it is not necessary for the first femtocell base station 1-1 to grasp a transmission destination of the resource division information by the femto GW 4.

The resource division information acquisition unit 19 arranged in the second femtocell base station 1-2 acquires the resource division information of the first femtocell base station 1-1 from the femto GW 4. The acquired resource division information is transmitted to the resource division detection unit 14. The resource division detection unit 14 determines whether the first femtocell base station 1-1 is executing the transmission power control or the radio resource division control, by using the resource division information in place of information from the quality information acquisition unit 16.

Figure 11:
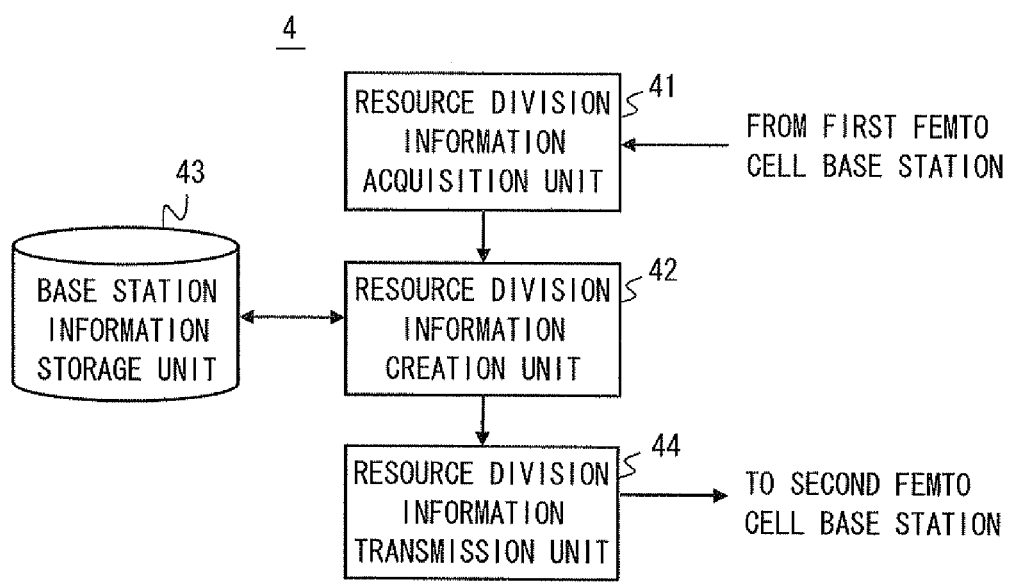
FIG. 11 is a block diagram of a femto GW 4 according to the third illustrative embodiment.

FIG. 11 is a block diagram showing an illustrative configuration of the femto GW 4 according to the third illustrative embodiment. The femto GW 4 shown in FIG. 11 includes a resource division information acquisition unit 41, a resource division information creation unit 42, a base station information storage unit 43, and a resource division information transmission unit 44.

The resource division information acquisition unit 41 acquires the resource division information from the first femtocell base station 1-1.

The resource division information creation unit 42 selects a femtocell base station as a transfer destination of the resource division information received from the first femtocell base station 1-1. It is not necessary for the resource division information creation unit 42 to change contents of the resource division information received from the first femtocell base station 1-1. The resource division information creation unit 42 may select a femtocell base station which is disposed around the femtocell base station 1-1 and can cause ICI with the femtocell base station 1-1. In the third illustrative embodiment, the second femtocell base station 1-2 is selected as a transfer destination of the resource division information received from the femtocell base station 1-1. For example, the resource division information creation unit 42 selects a femtocell base station positioned within a predetermined range from a place where the first femtocell base station 1-1 is installed. In this case, the femto GW 4 may collect, from the femtocell base stations 1-1 and 1-2, position information indicating places where the femtocell base stations 1-1 and 1-2 are installed, and may store the position information in the base station information storage unit 43 which will be described later. A GPS (Global Positioning System) receiver may be arranged in each of the femtocell base stations 1-1 and 1-2.

The base station information storage unit 43 holds information necessary for selecting a femtocell base station as a transfer destination of the resource division information. For example, the base station information storage unit 43 may hold position information indicating places where femtocell base stations are installed. The base station information storage unit 43 may hold an identifier of an adjacent femtocell base station for each femtocell base station. In this case, the femto GW 4 may receive information of an adjacent femtocell base station from each femtocell base station. Each femtocell base station notifies the femto GW 4 of identifiers of adjacent femtocells detected as a result of adjacent cell search performed by its own registered mobile station or by each femtocell base station itself operating in a mobile station mode (network listening mode (NLM)).

The resource division information transmission unit 44 transmits the resource division information of the first femtocell base station 1-1, the transfer destination of which is designated by the resource division information creation unit 42, to the second femtocell base station 1-2.

Figure 12:
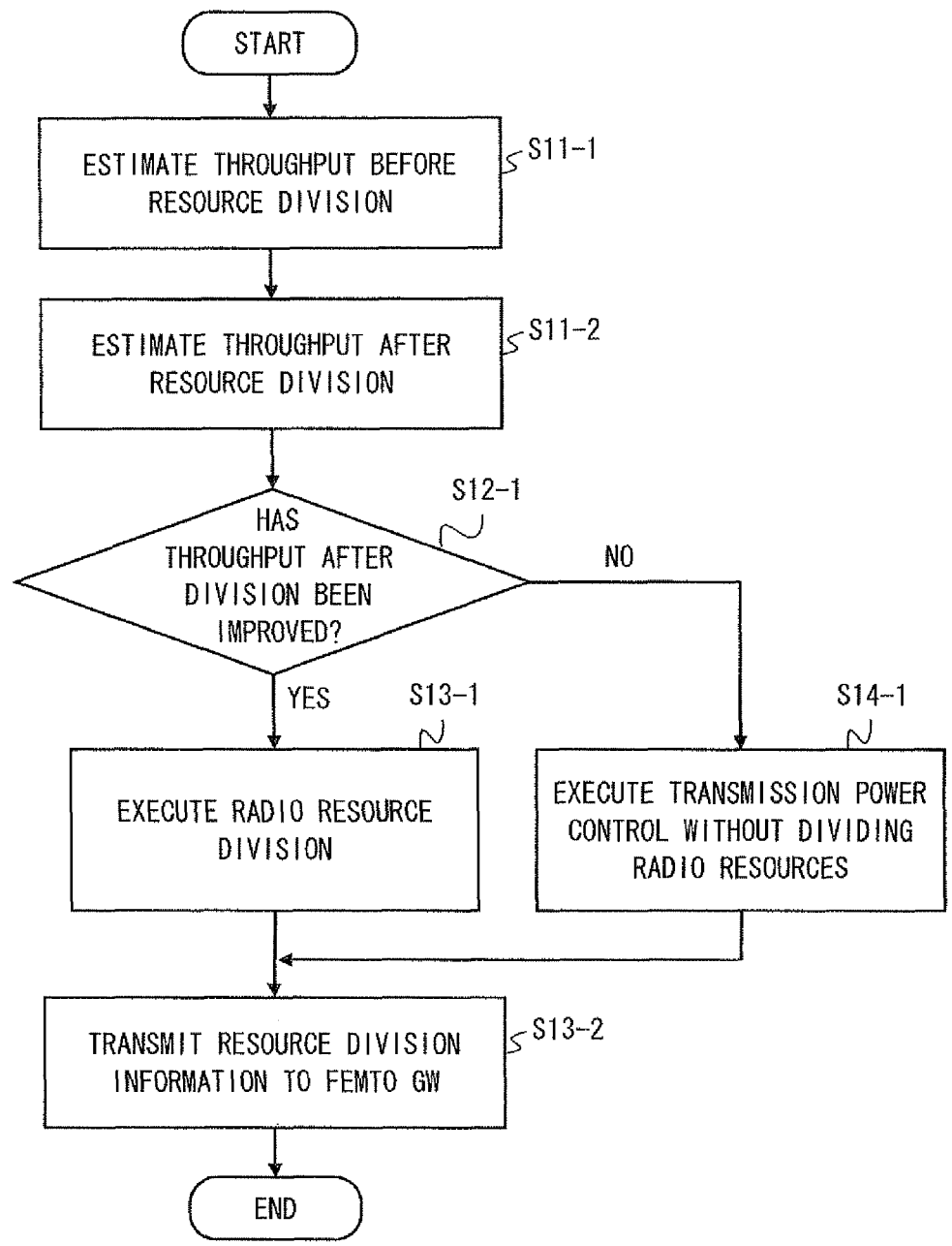
FIG. 12 is a flowchart showing a control procedure of the first femtocell base station according to the third illustrative embodiment.

In the following description, operation of the third illustrative embodiment will be described. An illustrative operation of the first femtocell base station 1-1 at the predetermined sub-frame timing will be described with reference to the flowchart of FIG. 12. FIG. 12 differs from FIG. 7 in that operation S13-2 is added. In operation S13-2, the resource division information transmission unit 18 transmits the resource division information to the femto GW 4. The resource division information includes information indicating whether the first femtocell base station 1-1 is executing the transmission power control or the radio resource division control.

Figure 13:
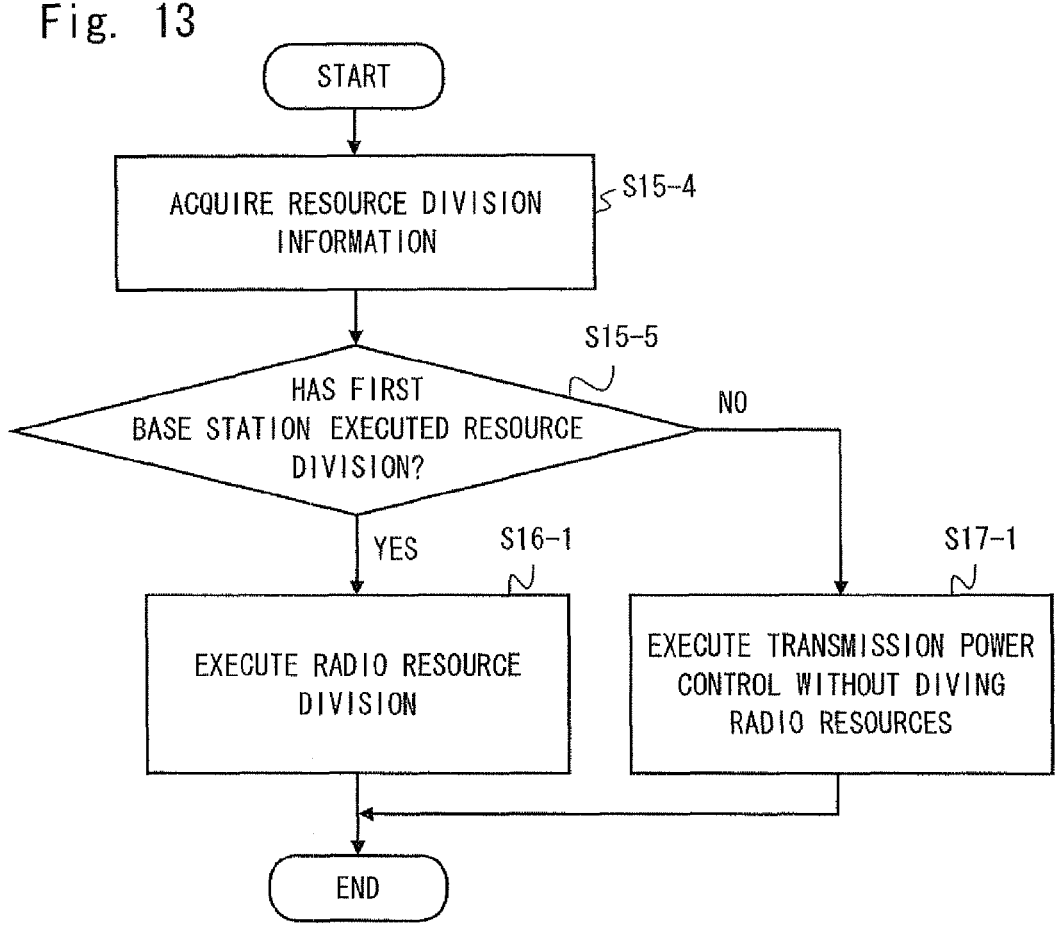
FIG. 13 is a flowchart showing a control procedure of the second femtocell base station according to the third illustrative embodiment.

Next, an illustrative operation of the second femtocell base station 1-2 at the predetermined sub-frame timing will be described with reference to the flowchart of FIG. 13. FIG. 13 differs from FIG. 8 in that operations S15-1, S15-2, and S15-3 are replaced with operations S15-4 and S15-5.

In operation S15-4, the resource division information acquisition unit 19 acquires the resource division information from the femto GW 4.

In operation S15-5, the resource division detection unit 14 decodes the resource division information, and detects which one of the transmission power control and the radio resource division control is being executed by the first femtocell base station 1-1. When it is detected that the first femtocell base station 1-1 is executing the radio resource division control, the flow proceeds to operation S16-1. When it is detected that the first femtocell base station 1-1 is executing the transmission power control, the flow proceeds to operation S17-1.

Figure 14:
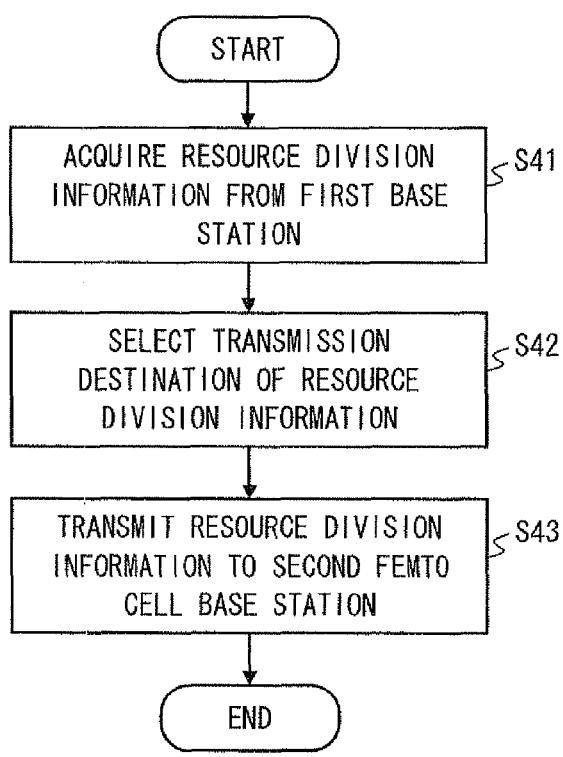
FIG. 14 is a flowchart showing a control procedure of the femto GW 4 according to the third illustrative embodiment.

Next, an illustrative operation of the femto GW 4 at the predetermined sub-frame timing will be described with reference to the flowchart of FIG. 14. In operation S41, the resource division information acquisition unit 41 acquires the resource division information from the first femtocell base station 1-1.

In operation S42, the resource division information creation unit 42 selects a femtocell base station as a transfer destination of the resource division information, with reference to the base station information storage unit 43. In the third illustrative embodiment, the second femtocell base station 1-2 is selected as a transfer destination.

In operation S43, the resource division information transmission unit 44 transmits the resource division information of the first femtocell base station 1-2 to the second femtocell base station 1-2.

As described above, the femtocell base station 1-1 according to the third illustrative embodiment uses a throughput as the downlink communication quality, and executes the radio resource division control when an improvement in the downlink throughput is expected after the radio resource division. Further, the femtocell base station 1-2 can detect that the base station 1-1 has executed radio resource division, by receiving the resource division information of the femtocell base station 1-1 from the femto GW 4. Therefore, according to the femtocell base stations 1-1 and 1-2 of the third illustrative embodiment, a decrease in use efficiency of the radio resources can be avoided in the situation where the influence of ICI is small, and unfairness in the communication quality between adjacent cells can be avoided in the situation where the influence of ICI is large, as in the first illustrative embodiment described above.

<Other Illustrative Embodiments>

The first to third illustrative embodiments have described the case where the present invention is applied to a W-CDMA or E-UTRA radio communication system. However, the present invention is not particularly limited to such radio communication systems. For example, the present invention can also be applied to radio communication systems (i.e. WiMAX and IEEE 802.16m) in which a TDD (Time Division Duplex) system uses the same radio frequency in an uplink and a downlink at different times.

Further, the configurations of the femtocell base stations 1-1 and 1-2 described in the first to third illustrative embodiments are illustrated by way of example only, and other configurations may also be employed. For example, the functions of the communication quality estimation unit 11, the resource division determination unit 12, and the resource division detection unit 14 may be arranged in apparatuses arranged in the network 5, such as the femto GW 4, an RNC (Radio Network Controller), or a management OAM (Operation and Maintenance) server. In this case, higher-level apparatuses collect the downlink reception quality information measured by the mobile station 2 and determine whether to execute radio resource division. The femtocell base stations 1-1 and 1-2 may perform switching between the transmission power control and the radio resource division control in response to a notification from the higher-level apparatuses. Thus, the functions can be arbitrarily divided between the femtocell base stations 1-1 and 1-2 and the higher-level network 5 to which these femtocell base stations are connected.

Though the first to third illustrative embodiments have described frequency resource division as a specific example of radio resource division, time resource division may be carried out. In this case, for example, one sub-frame may be divided into two sets of transmission time slots so that the first half of the time slot set can be used by the first femtocell base station 1-1 and the latter half of the time slot set can be used by the second femtocell base station 1-2.

The first to third illustrative embodiments have described the case where the present invention is applied to femtocell base stations. However, the present invention is not limited to the femtocell base stations, but can also be applied to a pico base station, a micro base station, and a macro base station which cover a wider range than the femtocell base stations.

The first to third illustrative embodiments have illustrated examples where the mobile stations 2-1 and 2-2 measure the reception qualities of downlinks from a macro base station or another femtocell base station. However, the femtocell base stations 1-1 and 1-2 themselves may measure downlink reception qualities. Specifically, a downlink reception quality measuring function similar to that of the mobile station 2 may be installed in the femtocell base station 1. This function is called "Network Listening Mode (NLM)" which is already installed in a typical femtocell base station. The NLM is typically used for setting transmission power upon activation of a femtocell base station. Alternatively, the reception quality may be measured at other timings, for example, when communication is not performed with a registered mobile station, or at a transmission stop timing (transmission gap time) during the communication with the registered mobile station.

The second and third illustrative embodiments have illustrated examples where radio resource division is executed when an increase in throughput obtained from the SINR assuming that the radio resource division is executed exceeds the predetermined threshold. However, instead of the throughput, the SINR may be used as the communication quality of the downlink for use in determining whether to execute radio resource division. In this case, radio resource division may be executed when the increase in SINR exceeds the predetermined threshold assuming that radio resource division is executed, without converting the SINR into a throughput.

The first to third illustrative embodiments have mainly described the case where each of the femtocell base stations 1-1 and 1-2 is connected with one registered mobile station. However, the number of mobile stations connects to the femtocell base stations 1-1 and 1-2 may be arbitrarily determined. In this case, the femtocell base station 1-1 may estimate a change in communication quality before and after the radio resource division for a plurality of registered mobile stations, and may compare a maximum amount of improvement with a predetermined threshold by focusing attention on a registered mobile station having the maximum amount of improvement in the communication quality (i.e., a registered mobile station having a poorest communication quality before the radio resource division).

Further, the third illustrative embodiment has illustrated the example where the resource division information is exchanged between femtocell base stations through the femto GW 4. However, the resource division information may be directly exchanged between femtocell base stations through a communication interface (e.g. X2 interface in E-UTRA system) which can be used between the femtocell base stations. In this case, the femtocell base station 1-1 itself holds information of the adjacent femtocell base station 1-2, and selects a transmission destination of the resource division information. Further, the resource division information of the femtocell base station 1-1 may be transmitted to the femtocell base station 1-2 through an apparatus other than the femto GW 4, such as a management OAM server, for example.

The first to third illustrative embodiments have described the case where the two femtocell base stations 1-1 and 1-2 use divided radio resources exclusively each other. However, three or more femtocell base stations may exclusively use the divided radio resources among them. In this case, among the three or more femtocell base stations, any one of the femtocell base stations plays the role of the first femtocell base station 1-1, and the other femtocell base stations play the role of the second femtocell base station 1-2. The three or more femtocell base stations that operate in cooperation with each other may equally divide the radio resources upon execution of the radio resource division control. Alternatively, a larger amount of the radio resources may be preferentially given to any one of the base stations.

The determination as to switching between the transmission power control and the radio resource division control (for example, processing shown in the flowcharts of FIGS. 3, 4, 7, 8, 12, and 13) performed by the femtocell base stations 1-1 and 1-2 as described in the first to third illustrative embodiments may be executed at a cycle of tens of sub-frames (tens of msec) or hundreds of sub-frames (hundreds of msec), or at a longer cycle (several seconds, several minutes, or the like) in the case of LTE or LTE-Advanced. Because the processing loads on both the base station and the mobile station are large when the dynamic ICIC per sub-frame (1 msec) as described in PTL 3 is carried out. One of objects of the first to third illustrative embodiments is to avoid ICI when the registered mobile station of the adjacent femtocell suddenly approaches to the femto base station. Taking into consideration the movement speed of the mobile station, when the determination as to switching between the transmission power control and the radio resource division control is executed at a cycle of hundreds of sub-frames or at a longer cycle, ICI can be suppressed in the case where the registered mobile station of the adjacent femtocell suddenly approaches, and the unfairness in the communication quality between adjacent cells can be avoided.

Hereinafter, a description is given of specific examples of radio resource division when the above-mentioned illustrative embodiments are applied to an LTE (E-UTRA) radio communication system.

SPECIFIC EXAMPLE 1

In Specific Example 1, frequency resource division is carried out for only the data channel (PDSCH), among LTE downlink channels, as a target for the radio resource division. FIGS. 15A and 15B show an example of radio resource division relating to Specific Example 1. FIG. 15A shows radio resources (resource blocks) used by the first femtocell base station 1-1, and FIG. 15B shows radio resources (resource blocks) used by the second femtocell base station 1-2. The PDSCH and PDCCH are typically transmitted using the entire frequency band for each sub-frame when user data to be transmitted is present. FIGS. 15A and 15B show a state where, among the data channel (PDSCH), the control channel (PDCCH), and the reference signal, only the data channel (PDSCH) is subjected to frequency division between the femtocell base stations 1-1 and 1-2. Assume herein that the reference signals are designed so as not to overlap each other between the femtocell base stations 1-1 and 1-2. As a result, ICI between the data channels (PDSCH) can be avoided without changing the settings of the system band or the like, while ICIs between the control channels (PDCCH), between the control channel (PDCCH) and the reference signal, and between the data channel (PDSCH) and the reference signal still remain.

SPECIFIC EXAMPLE 2

Figure 16B:
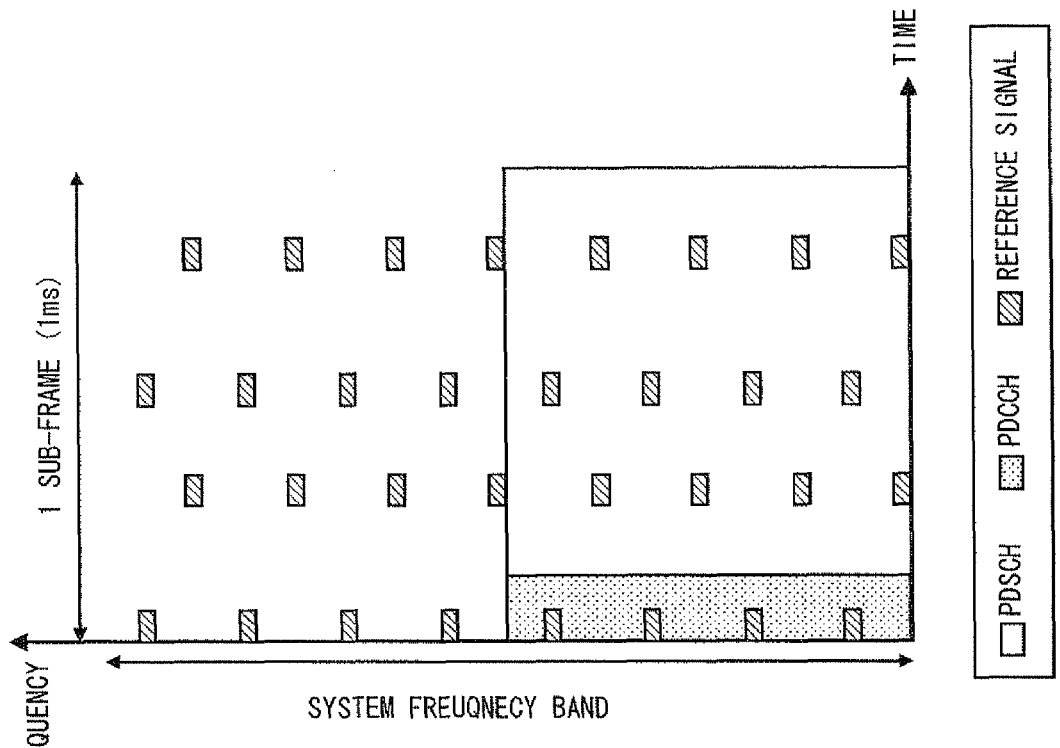
FIGS. 16A and 16B are diagrams showing an example of frequency resource division in Specific Example 2 according to the first to third illustrative embodiments.
Figure 16A:
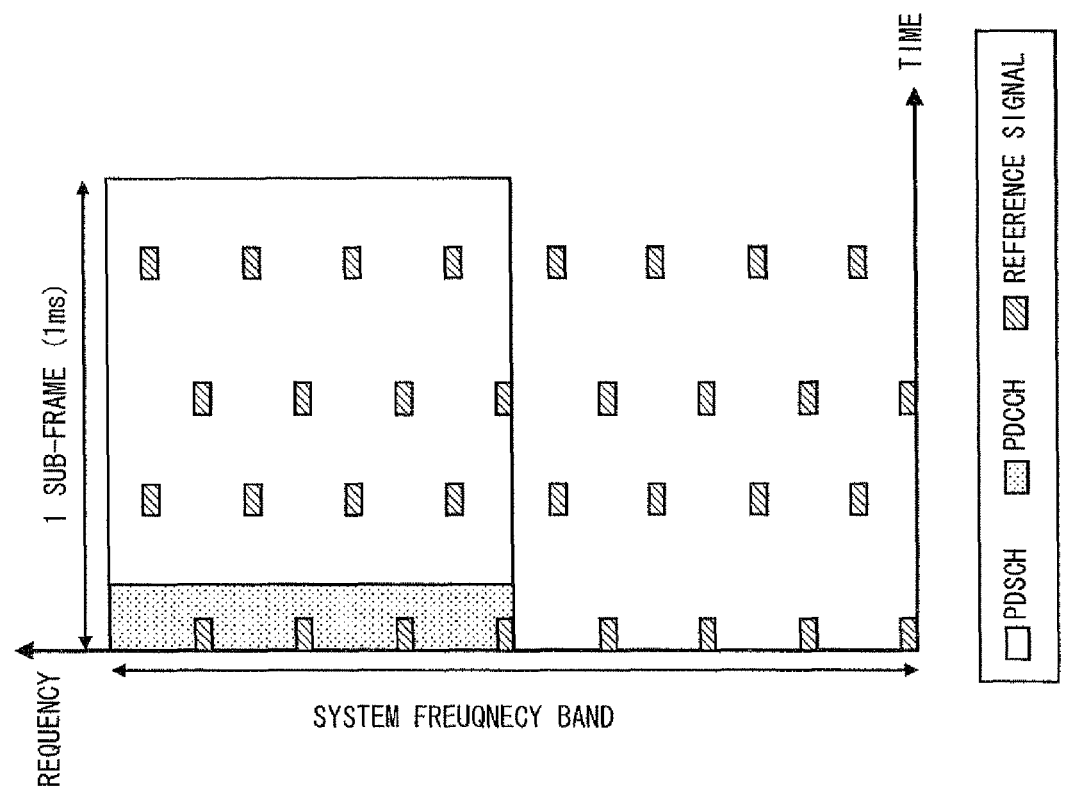

In Specific Example 2, frequency resource division is carried out for the data channel (PDSCH) and the control channel (PDCCH), among the LTE downlink channels, as targets for the radio resource division. FIGS. 16A and 16B show an example of radio resource division relating to Specific Example 2. FIG. 16A shows radio resources (resource blocks) used by the first femtocell base station 1-1, and FIG. 16B shows radio resources (resource blocks) used by the second femtocell base station 1-2. FIGS. 16A and 16B show a state where, among the data channel (PDSCH), the control channel (PDCCH), and the reference signal, the data channel (PDSCH) and the control channel (PDCCH) are subjected to frequency division between the femtocell base stations 1-1 and 1-2. As a result, ICIs between the control channels (PDCCHs) and between the data channels (PDSCHs) can be avoided without changing the settings of the system band or the like, while ICIs between the control channel (PDCCH) and the reference signal and between the data channel (PDSCH) and the reference signal still remain.

SPECIFIC EXAMPLE 3

Figure 20B:
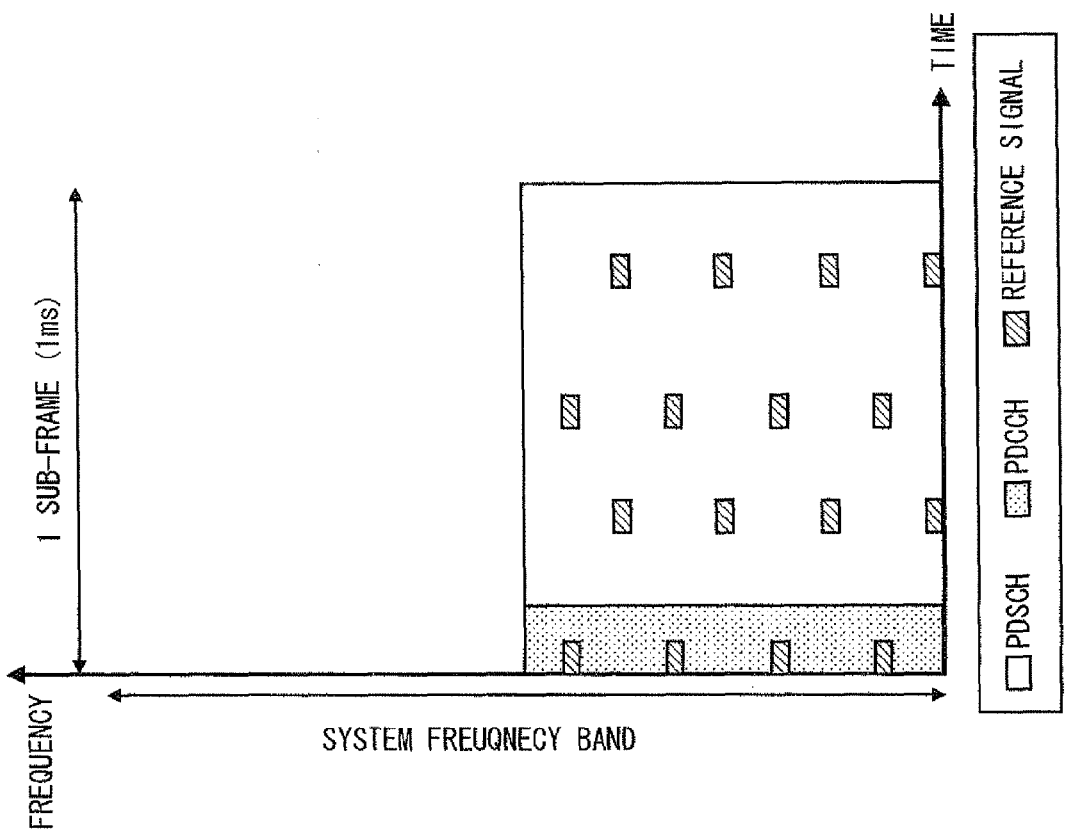
FIGS. 20A and 20B are diagrams showing an example of frequency resource division disclosed in NPL 1.
Figure 20A:
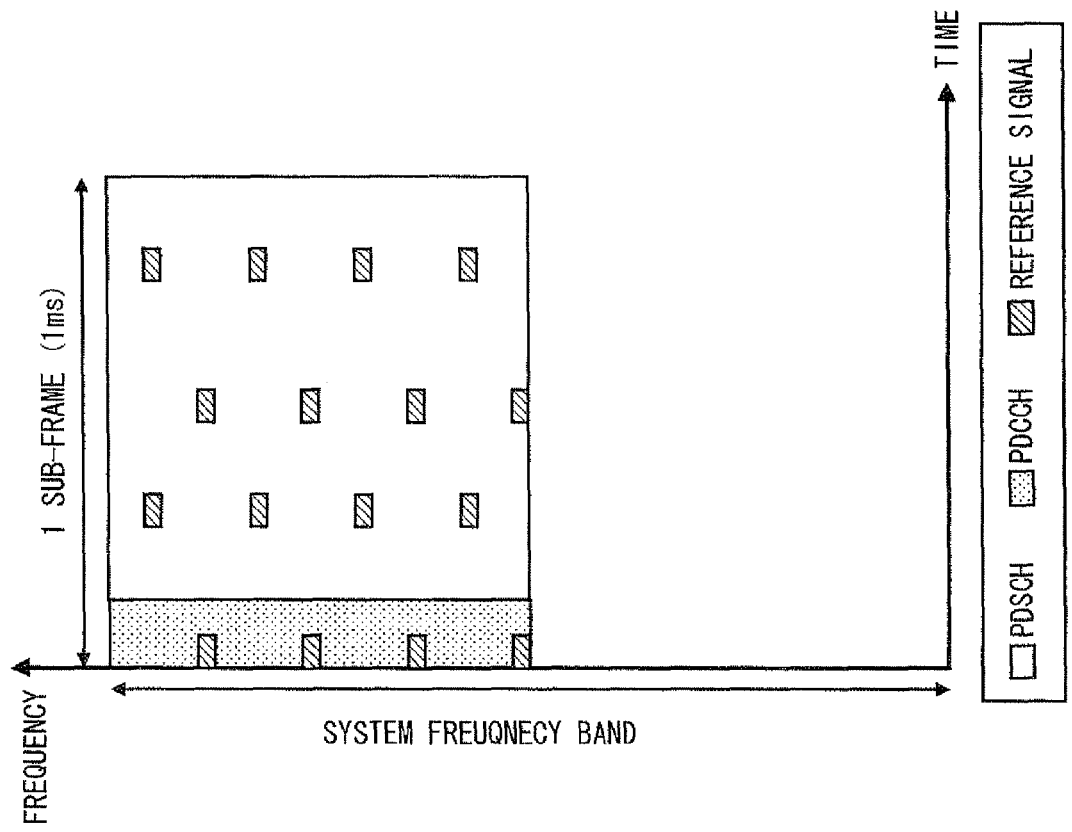
Figure 21A:
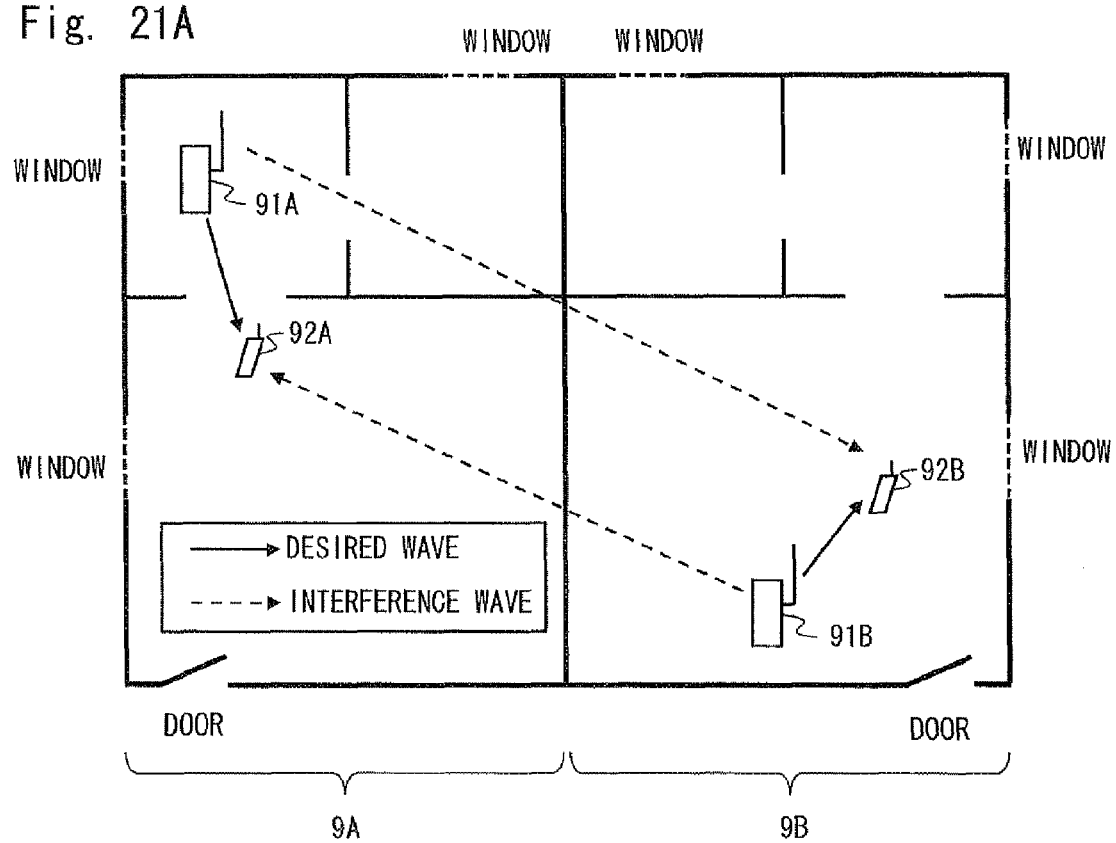
FIGS. 21A and 21B are diagrams for explaining a problem occurring when a femtocell base station is used.
Figure 21B:
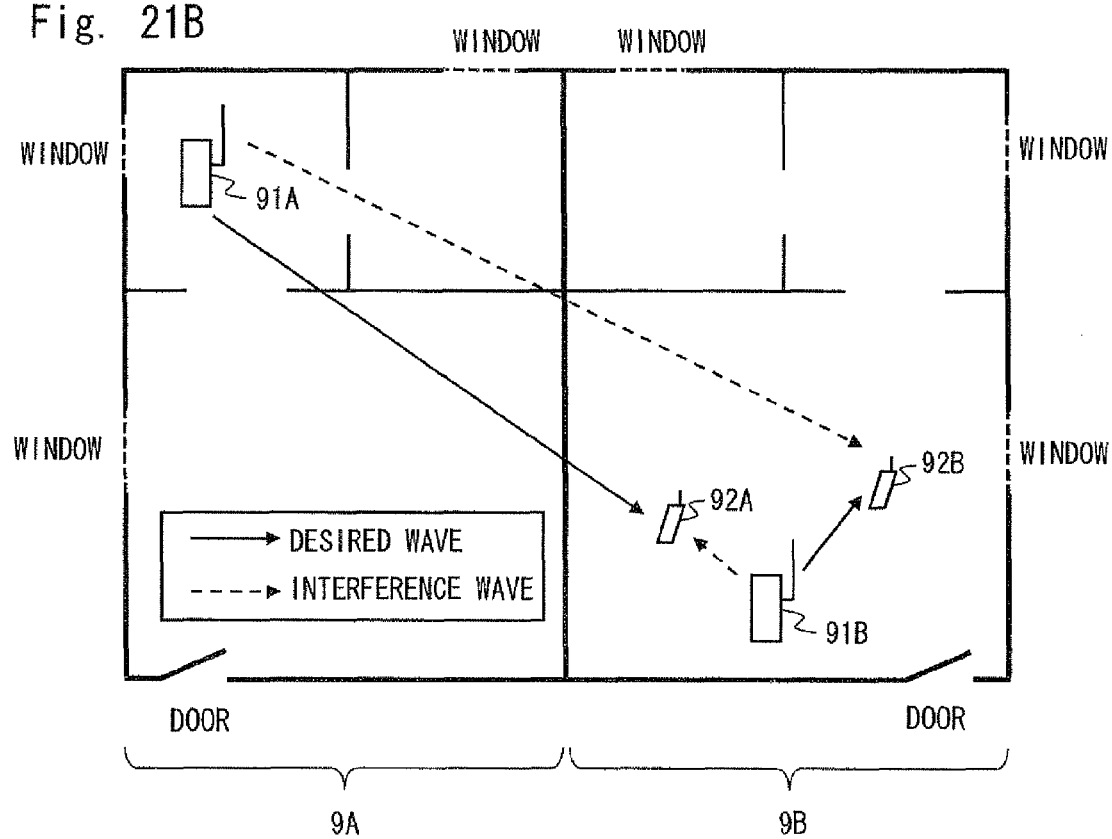

In Specific Example 3, frequency resource division is carried out for the data channel (PDSCH), the control channel (PDCCH), and the reference signal, among the LTE downlink channels, as targets for the radio resource division. The example of radio resource division relating to Specific Example 3 is similar to that described in the Background Art section with reference to FIGS. 20A and 20B. FIGS. 20A and 20B show a state where all of the data channel (PDSCH), the control channel (PDCCH), and the reference signal are subjected to frequency division between the femtocell base stations 1-1 and 1-2. Thus, all ICIs between the control channel (PDCCH) and the reference signal, between the data channel (PDSCH) and the reference signal, between the control channels (PDCCHs), and between the data channels (PDSCHs) can be avoided, while the settings of the system band or the like need to be changed in some cases.

SPECIFIC EXAMPLE 4

In Specific Example 4, frequency resource division is carried out, while further taking into consideration an SCH (Synchronization Channel) and a BCH (Broadcast Channel) which are included in the LTE downlink channels. The SCH is a control channel for use in cell searching and includes a primary SCH and a secondary SCH. The BCH is a control channel for transmitting broadcast information. The SCH is transmitted at a 5 msec cycle (at a cycle of 5 sub-frames) by using six resource blocks at the center of the frequency band. The BCH is transmitted using six resource blocks at the center of the frequency band of four sub-frames at a 40 msec cycle (at a cycle of 40 sub-frames).

Figure 17B:
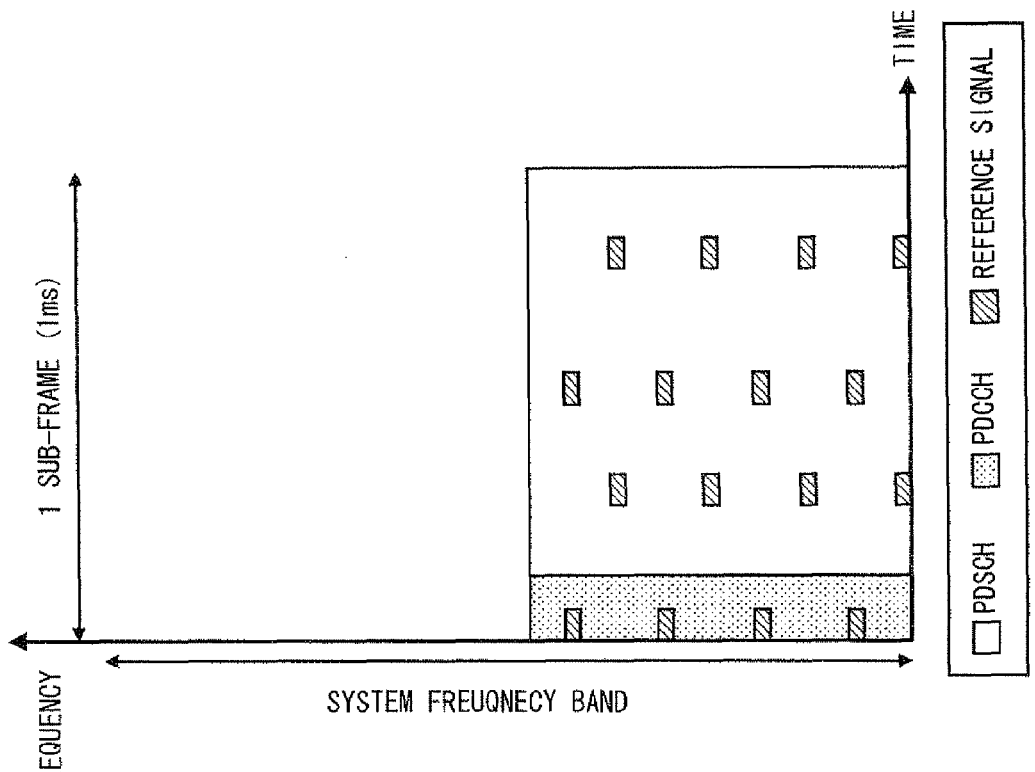
FIGS. 17A and 17B are diagrams showing an example of frequency resource division in Specific Example 4 according to the first to third illustrative embodiments.
Figure 17A:
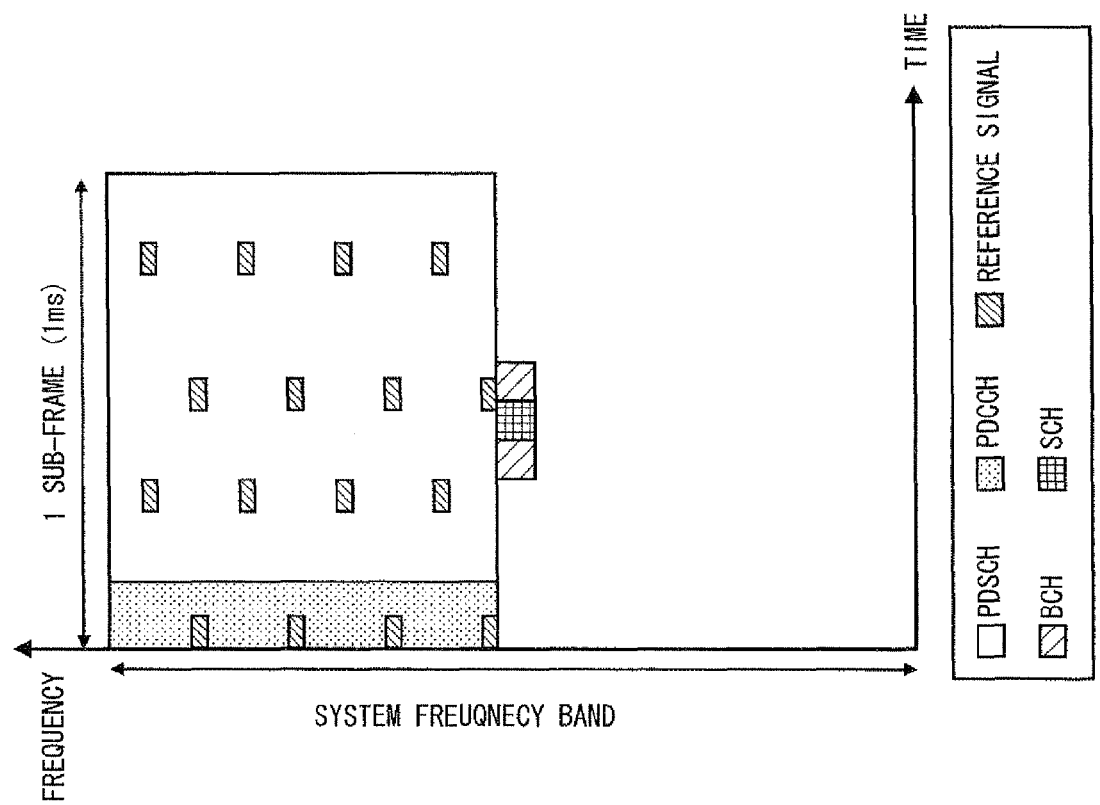

FIGS. 17A and 17B show an example of the radio resource division of Specific Example 4. FIG. 17A shows radio resources (resource blocks) used by the first femtocell base station 1-1, and FIG. 17B shows radio resources (resource blocks) used by the second femtocell base station 1-2. FIGS. 17A and 17B show a state where the data channel (PDSCH), the control channel (PDCCH), and the reference signal are subjected to frequency division between the femtocell base stations 1-1 and 1-2, as with Specific Example 3. The six central resource blocks for use in transmitting the BCH and SCH are used only for transmission of the BCH and SCH, and are not used for transmission of the data channel (PDSCH), the control channel (PDCCH), and the reference signal. The femtocell base stations 1-1 and 1-2 transmit the BCH and SCH at different timings so as not to overlap each other. As a result, all ICIs among the LTE downlink channels can be avoided, while the settings of the system band or the like needs to be changed in some cases.

SPECIFIC EXAMPLE 5

In Specific Example 5, frequency resource division is carried out for the data channel (PDSCH), the control channel (PDCCH), and the reference signal, among the LTE downlink channels, as targets for the radio resource division, as with Specific Example 3. In Specific Example 5, an LTE carrier aggregation is introduced. In this case, the system band is composed of a plurality of component carriers, and the femtocell base stations 1-1 and 1-2 use at least one specific component carrier as a primary carrier.

FIGS. 18A and 18B show an example of radio resource division relating to Specific Example 5. FIG. 18A shows radio resources (resource blocks) used by the first femtocell base station 1-1, and FIG. 18B shows radio resources (resource blocks) used by the second femtocell base station 1-2. FIGS. 18A and 18B show a state where the data channel (PDSCH), the control channel (PDCCH), and the reference signal are subjected to frequency division between the femtocell base stations 1-1 and 1-2. In the case of performing the transmission power control, however, the each femtocell base stations 1-1 and 1-2 each can allocate both Component Carriers #1 and #2 to the downlink communication. On the other hand, after the frequency resource division, the femtocell base station 1-1 uses Component Carrier #1 as a primary carrier, and the femtocell base station 1-2 uses Component Carrier #2 as a primary carrier. As a result, all ICIs can be avoided, while the settings of each component carrier for used as a primary carrier need to be changed.

SPECIFIC EXAMPLE 6

In Specific Example 6, time resource division is carried out for the data channel (PDSCH), the control channel (PDCCH), and the reference signal, among the LTE downlink channels, as targets for the radio resource division. FIGS. 19A and 19B show an example of radio resource division relating to Specific Example 6. FIG. 19A shows radio resources (resource blocks) used by the first femtocell base station 1-1, and FIG. 19B shows radio resources (resource blocks) used by the second femtocell base station 1-2. FIGS. 19A and 19B show a state where the data channel (PDSCH), the control channel (PDCCH), and the reference signal are subjected to time division between the femtocell base stations 1-1 and 1-2. In FIGS. 19A and 19B, one sub-frame of 1 msec is divided into two time-slot-sets of 0.5 msec. As a result, all ICIs between the control channel (PDCCH) and the reference signal, between the data channel (PDSCH) and the reference signal, between the control channels (PDCCHs), and between the data channels (PDSCHs) can be avoided, while the settings of the system band or the like need to be changed in some cases. Note that the method of dividing time resources described in this Specific Example corresponds to the concept of Specific Example 3 in which frequency resource division is executed. In addition to the method of time resource division described in this Specific Example, time resource division can also be executed based on the concepts respectively corresponding to Specific Examples 1, 2, and 4.

Moreover, the present invention is not limited to the above illustrative embodiments, but can be modified in various manners without departing from the gist of the present invention described above.

For example, a part or all of the illustrative embodiments described above can be expressed as the following supplementary notes, but the present invention is not limited to the supplementary notes described below.

(Supplementary Note 1)

A radio communication system including:

a first base station configured to perform bidirectional radio communication including a first downlink communication and a first uplink communication with a first mobile station;

a second base station configured to perform bidirectional radio communication including a second downlink communication and a second uplink communication with a second mobile station;

a first resource adjustment unit adapted to determine radio resources to be allocated to the first downlink communication from a radio resource region shared between the first and second base stations;

a quality estimation unit adapted to estimates communication quality of the first downlink communication when radio resources allocatable to the first downlink communication are limited to a part of the radio resource region;

a first resource division unit adapted to limit, to a first radio resource segment which is a part of the radio resource region, radio resources allocatable to the first downlink communication by the first resource adjustment unit upon transmission of at least user data, when an improvement in the communication quality of the first downlink communication is expected in a case where the first radio resource segment is exclusively used with the second base station upon transmission of at least user data based on an estimation result of the communication quality, compared to a case where the entire range of the radio resource region is shared with the second base station;

a second resource adjustment unit adapted to determine radio resources to be allocated to the second downlink communication from the radio resource region;

a detection unit adapted to detect execution of resource division for limiting radio resources used for the first downlink communication to the first radio resource segment; and a second resource division unit adapted to limit, to a second radio resource segment which is a part of the radio resource region and different from the first radio resource segment, radio resources allocatable to the second downlink communication by the second resource adjustment unit upon transmission of at least user data in response to detection of the resource division.

(Supplementary Note 2)

The radio communication system according to Supplementary note 1, wherein each of the first and second resource adjustment unit is further adapted to perform a control for adjusting transmission power of a downlink signal to suppress inter-cell interference between the first and second base stations, when the radio resource region is shared between the first and second downlink communications without executing the resource division.

(Supplementary Note 3)

The radio communication system according to Supplementary note 1 or 2, wherein the detection unit detects execution of the resource division in the first base station based on a change in reception quality of a downlink signal from the second base station, the reception quality is measured by the second mobile station.

(Supplementary Note 4)

The radio communication system according to Supplementary note 1 or 2, wherein the detection unit detects execution of the resource division in the first base station, by receiving a notification from the first base station or a higher-level network to which the first and second base stations are connected.

(Supplementary Note 5)

The radio communication system according to any one of Supplementary notes 1 to 4, wherein the quality estimation unit estimates the communication quality of the first downlink communication by using a reception quality in a downlink direction measured by the first mobile station.

(Supplementary Note 6)

The radio communication system according to any one of Supplementary notes 1 to 5, wherein the communication quality of the first downlink communication includes at least one of a throughput of the first downlink communication and an SINR (Signal-to-Interference plus Noise power Ratio).

(Supplementary Note 7)

The radio communication system according to any one of Supplementary notes 1 to 6, wherein the first resource adjustment unit, the quality estimation unit, and the first resource division unit are arranged integrally with the first base station, and the second resource adjustment unit, the detection unit, and the second resource division unit are arranged integrally with the second base station.

(Supplementary Note 8)

The radio communication system according to Supplementary note 7, wherein the second base station further includes units corresponding to the quality estimation unit and the first resource division unit so as to voluntary perform radio resource division based on a communication quality of the second downlink communication, and the first base station further includes units corresponding to the detection unit and the second resource division unit so as to perform radio resource division in response to execution of the resource division by the second base station.

(Supplementary Note 9)

A base station apparatus including:

a radio communication unit adapted to perform bidirectional radio communication including a first downlink communication and a first uplink communication with a first mobile station;

a resource adjustment unit adapted to determine radio resources to be allocated to the first downlink communication from a radio resource region shared with an adjacent base station;

a first resource division unit adapted to limit, to a first radio resource segment which is a part of the radio resource region, radio resources allocatable to the first downlink communication by the resource adjustment unit upon transmission of at least user data, when an improvement in communication quality of the first downlink communication is expected in a case where the first radio resource segment is exclusively used with the adjacent base station upon transmission of at least user data, compared to a case where the entire range of the radio resource region is shared with the adjacent base station;

a detection unit adapted to detect execution of resource division by the adjacent base station for limiting radio resources used for a second downlink communication between the adjacent base station and a second mobile station to a second radio resource segment; and a second resource division unit adapted to limit, to a third radio resource segment which is a part of the radio resource region and different from the second radio resource segment, radio resources allocatable to the first downlink communication by the resource adjustment unit upon transmission of at least user data in response to detection of the resource division by the detection unit.

(Supplementary Note 10)

The base station apparatus according to Supplementary note 9, further comprising a quality estimation unit adapted to estimate communication quality of the first downlink communication when radio resources allocatable to the first downlink communication are limited to a part of the radio resource region.

(Supplementary Note 11)

The base station apparatus according to Supplementary note 9 or 10, wherein the resource adjustment unit further adapted to perform a control for adjusting transmission power of a downlink signal to suppress inter-cell interference between the base station apparatus and the adjacent base station, when the radio resource region is shared between the first and second downlink communications without executing the resource division.

(Supplementary Note 12)

The base station apparatus according to any one of Supplementary notes 9 to 11, wherein the detection unit detects execution of the resource division in the adjacent base station based on a change in reception quality of a downlink signal from the base station apparatus measured by the first mobile station.

(Supplementary Note 13)

The base station apparatus according to any one of Supplementary notes 9 to 11, wherein the detection unit detects execution of the resource division in the adjacent base station, by receiving a notification from the adjacent base station or a higher-level network to which the base station apparatus and the adjacent base station are connected.

(Supplementary Note 14)

The base station apparatus according to Supplementary note 10 or any one of Supplementary notes 11 to 13 depending on Supplementary note 10, wherein the quality estimation unit estimates the communication quality of the first downlink communication by using a reception quality in a downlink direction measured by the first mobile station.

(Supplementary Note 15)

The base station apparatus according to any one of Supplementary notes 9 to 14, wherein the communication quality of the first downlink communication includes at least one of a throughput of the first downlink communication and an SINR (Signal-to-Interference plus Noise power Ratio).

(Supplementary Note 16)

A method for controlling radio resources used by a radio base station that performs bidirectional radio communication including a first downlink communication and a first uplink communication with a first mobile station, the method including:

estimating a communication quality of the first downlink communication when radio resources allocatable to the first downlink communication are limited to a part of a radio resource region shared with an adjacent base station;

limiting, to a first radio resource segment which is a part of the radio resource region, radio resources allocatable to the first downlink communication upon transmission of at least user data, when an improvement in the communication quality of the first downlink communication is expected in a case where the first radio resource segment is exclusively used with the adjacent base station upon transmission of at least user data, compared to a case where the entire range of the radio resource region is shared with the adjacent base station;

detecting execution of resource division by the adjacent base station for limiting radio resources used for a second downlink communication between the adjacent base station and a second mobile station to a second radio resource segment; and limiting, to a third radio resource segment which is a part of the radio resource region and different from the second radio resource segment, radio resources allocatable to the first downlink communication upon transmission of at least user data in response to said detecting.

(Supplementary Note 17)

The method according to Supplementary note 16, wherein said detecting includes detecting the execution of the resource division by the adjacent base station based on a change in reception quality of a downlink signal from the radio base station, the reception quality is measured by the first mobile station.

(Supplementary Note 18)

The method according to Supplementary note 16, wherein said detecting includes detecting the execution of the resource division by the adjacent base station by receiving a notification from the adjacent base station or a higher-level network to which the radio base station and the adjacent base station are connected.

(Supplementary Note 19)

The method according to any one of Supplementary notes 16 to 18, further including estimating the communication quality of the first downlink communication by using a reception quality in a downlink direction measured by the first mobile station.

(Supplementary Note 20)

A program for causing a computer to execute a method set forth in any one of Supplementary notes 16 to 19.

What is claimed is:

1. A radio communication system comprising:
a first base station configured to perform radio communication including at least a first downlink communication with a first mobile station;
a second base station configured to perform radio communication including at least a second downlink communication with a second mobile station;
a first resource adjustment unit configured to determine radio resources to be allocated to the first downlink communication from a radio resource region shared between the first and second base stations;
a quality estimation unit configured to estimate communication quality of the first downlink communication when radio resources allocatable to the first downlink communication are limited to a part of the radio resource region;
a first resource division unit configured to limit, to a first radio resource segment which is a part of the radio resource region, radio resources in response to estimating that communication quality of the first downlink communication using the limited first radio resource segment is improved over the communication quality of the first downlink communication when using the entire range of the radio resource region that is shared with the second base station;

a second resource adjustment unit configured to determine radio resources to be allocated to the second downlink communication from the radio resource region;

a detection unit configured to detect execution of resource division for limiting radio resources used for the first downlink communication to the first radio resource segment; and a second resource division unit configured to limit, to a second radio resource segment which is a part of the radio resource region and different from the first radio resource segment, radio resources allocatable to the second downlink communication by the second resource adjustment unit in response to detection of the resource division.

2. The radio communication system according to claim 1, wherein each of the first and second resource adjustment units is further configured to perform a control for adjusting transmission power of a downlink signal to suppress inter-cell interference between the first and second base stations, when the radio resource region is shared between the first and second downlink communications without executing the resource division.

3. The radio communication system according to claim 1, wherein the detection unit detects execution of the resource division in the first base station based on a change in reception quality of a downlink signal from the second base station, the reception quality is measured by the second mobile station.

4. The radio communication system according to claim 1, wherein the detection unit detects execution of the resource division in the first base station, by receiving a notification from the first base station or a network station to which the first and second base stations are connected, in which the network station is a higher-level station than the first and second base stations.

5. The radio communication system according to claim 1, wherein the quality estimation unit estimates the communication quality of the first downlink communication by using a reception quality in a downlink direction measured by the first mobile station.

6. The radio communication system according to claim 1, wherein the communication quality of the first downlink communication includes at least one of a throughput of the first downlink communication and an SINR (Signal-to-Interference plus Noise power Ratio).

7. The radio communication system according to claim 1, wherein the first resource adjustment unit, the quality estimation unit, and the first resource division unit are arranged integrally with the first base station, and the second resource adjustment unit, the detection unit, and the second resource division unit are arranged integrally with the second base station.

8. The radio communication system according to claim 7, wherein the second base station further comprises units corresponding to the quality estimation unit and the first resource division unit so as to voluntary perform radio resource division based on a communication quality of the second downlink communication, and the first base station further comprises units corresponding to the detection unit and the second resource division unit so as to perform radio resource division in response to execution of the resource division by the second base station.

9. A base station apparatus comprising:

a radio communication unit configured to perform radio communication including at least a first downlink communication with a first mobile station;

a resource adjustment unit configured to determine radio resources to be allocated to the first downlink communication from a radio resource region shared with an adjacent base station;

a first resource division unit configured to limit, to a first radio resource segment which is a part of the radio resource region, radio resources in response to estimating that communication quality of the first downlink communication using the limited first radio resource segment is improved over the communication quality of the first downlink communication when using the entire range of the radio resource region that is shared with the adjacent base station;

a detection unit configured to detect execution of resource division by the adjacent base station for limiting radio resources used for a second downlink communication between the adjacent base station and a second mobile station to a second radio resource segment; and a second resource division unit configured to limit, to a third radio resource segment which is a part of the radio resource region and different from the second radio resource segment, radio resources allocatable to the first downlink communication by the resource adjustment unit in response to detection of the resource division by the detection unit.

10. The base station apparatus according to claim 9, further comprising a quality estimation unit configured to estimate the communication quality of the first downlink communication when radio resources allocatable to the first downlink communication are limited to a part of the radio resource region.

11. The base station apparatus according to claim 10, wherein the quality estimation unit estimates the communication quality of the first downlink communication by using a reception quality in a downlink direction measured by the first mobile station.

12. The base station apparatus according to claim 9, wherein the resource adjustment unit is further configured to perform a control for adjusting transmission power of a downlink signal to suppress inter-cell interference between the base station apparatus and the adjacent base station, when the radio resource region is shared between the first and second downlink communications without executing the resource division.

13. The base station apparatus according to claim 9, wherein the detection unit detects execution of the resource division in the adjacent base station based on a change in reception quality of a downlink signal from the base station apparatus measured by the first mobile station.

14. The base station apparatus according to claim 9, wherein the detection unit detects execution of the resource division in the adjacent base station, by receiving a notification from the adjacent base station or a network station to which the base station apparatus and the adjacent base station are connected, in which the network station is a higher-level station than the first and second base station.

15. The base station apparatus according to claim 9, wherein the communication quality of the first downlink communication includes at least one of a throughput of the first downlink communication and an SINR (Signal-to-Interference plus Noise power Ratio).

16. A method for controlling radio resources used by a radio base station that performs radio communication including at least a first downlink communication with a first mobile station, the method comprising:

estimating a communication quality of the first downlink communication when radio resources allocatable to the first downlink communication are limited to a part of a radio resource region shared with an adjacent base station;

limiting, to a first radio resource segment which is a part of the radio resource region, radio resources in response to estimating that communication quality of the first downlink communication when using the limited first radio resource segment is improved over the communication quality of the first downlink communication when using the entire range of the radio resource region that is shared with the adjacent base station;

detecting execution of resource division by the adjacent base station for limiting radio resources used for a second downlink communication between the adjacent base station and a second mobile station to a second radio resource segment; and limiting, to a third radio resource segment which is a part of the radio resource region and different from the second radio resource segment, radio resources allocatable to the first downlink communication in response to said detecting.

17. The method according to claim 16, wherein said detecting comprises detecting the execution of the resource division by the adjacent base station based on a change in reception quality of a downlink signal from the radio base station, the reception quality is measured by the first mobile station.

18. The method according to claim 16, wherein said detecting comprises detecting the execution of the resource division by the adjacent base station by receiving a notification from the adjacent base station or a network station to which the radio base station and the adjacent base station are connected, in which the network station is a higher-level station than the first and second base station.

19. The method according to claim 16, further comprising estimating the communication quality of the first downlink communication by using a reception quality in a downlink direction measured by the first mobile station.

* * * * *